US012697722B2

(12) United States Patent
Lu

(10) Patent No.: US 12,697,722 B2
(45) Date of Patent: Aug. 4, 2026

(54) BUILDING A ROBOT MISSION BASED ON MISSION METRICS

(71) Applicant: Yokogawa Electric Corporation, Tokyo (JP)

(72) Inventor: Brendon Bao-An Lu, Parker, TX (US)

(73) Assignee: Yokogawa Electric Corporation, Tokyo (JP)

( * ) Notice: Subject to any disclaimer, the term of this patent is extended or adjusted under 35 U.S.C. 154(b) by 227 days.

(21) Appl. No.: 18/077,964

(22) Filed: Dec. 8, 2022

(65) Prior Publication Data

US 2024/0189996 A1 Jun. 13, 2024

(51) Int. Cl.
B25J 9/16 (2006.01)
G05B 19/4155 (2006.01)

(52) U.S. Cl.
CPC ........ B25J 9/1656 (2013.01); G05B 19/4155 (2013.01); *G05B 2219/40089* (2013.01)

(58) Field of Classification Search
CPC ........ B25J 9/1656; B25J 11/008; B25J 19/02; B25J 5/00; B25J 9/0084; B25J 9/1661; B25J 13/006; B25J 9/161; B25J 9/1682; B25J 11/002; B25J 19/023; B25J 19/04; B25J 9/162; B25J 9/1628; B25J 9/163; B25J 9/1674; B25J 9/1692; B25J 9/1697; B25J 11/00; B25J 9/1669; G05B 19/4155; G05B 2219/40089; G05B 2219/40093;
(Continued)

(56) References Cited

U.S. PATENT DOCUMENTS 9,376,971 B2 * 6/2016 Luther .................. F02D 29/02
9,791,860 B2 10/2017 Phillips et al.
(Continued)

FOREIGN PATENT DOCUMENTS

CN 109202882 4/2021

OTHER PUBLICATIONS

Tsalatsanis A, Yalcin A, Valavanis KimonP. Dynamic Task Allocation in Cooperative Robot Teams. International Journal of Advanced Robotic Systems. 2009;6(4). doi:10.5772/10678 (Year: 2009).*
(Continued)

*Primary Examiner* — Adam R Mott
*Assistant Examiner* — James Miller Watts, III
(74) *Attorney, Agent, or Firm* — Sheridan Ross P.C.

(57) ABSTRACT

Methods and robot management systems for building a robot mission based on mission metrics are described, including: providing a data record of mission files associated with a set of recorded robot missions; receiving an input from a user including an indication of one or more robot-agnostic tasks to be performed with respect to an environment; determining first contextual information associated with the one or more robot-agnostic tasks; searching the data record of the mission files and identifying, based on the search and the first contextual information, one or more mission files including one or more tasks that match the one or more robot-agnostic tasks; generating ranking information associated with the one or more identified mission files based on recorded metrics data associated with the one or more identified mission files; and providing the one or more identified mission files based on the ranking information.

19 Claims, 16 Drawing Sheets

(58) Field of Classification Search

CPC ........ G05B 2219/40113; G05B 19/418; G05B 2219/50391; G05B 23/0283; G05B 2219/39024; G05B 2219/39377; G05B 2219/39448; G05B 19/41865; G05B 2219/34418; G05B 19/41895; G05B 2219/40298; G05B 2219/45063; G05D 1/0027; G05D 1/0291; G05D 1/0297; G05D 1/024; G05D 1/0246; G05D 1/0255; G05D 1/0274; G05D 1/0088; G06Q 10/06; G06Q 10/06311; G06Q 10/20; G06Q 50/02; G06Q 50/04; G06Q 50/06; G06Q 10/063114; G06Q 10/0631; G06Q 10/083; G06Q 50/40; B60W 60/001; G16H 40/20; Y10S 901/01; G06N 3/008; H04B 7/18519; Y02P 90/80; B07C 5/36; B65G 1/1371; B65G 1/1378; B65G 2203/041; B65G 2203/042; B66F 9/063; B66F 9/0755; G01S 15/04

See application file for complete search history.

(56) References Cited

U.S. PATENT DOCUMENTS

| | | | | |
|---|---|---|---|---|
| 10,061,470 | B2 * | 8/2018 | Richman | G01C 21/20 |
| 10,089,586 | B2 | 10/2018 | Vestal et al. | |
| 10,525,591 | B1 * | 1/2020 | Baroudi | B25J 9/1602 |
| 10,795,327 | B2 * | 10/2020 | Gray | G05B 13/027 |
| 11,835,953 | B2 * | 12/2023 | Ryan | G05B 19/042 |
| 2007/0022073 | A1 | 1/2007 | Gupta et al. | |
| 2015/0073594 | A1 * | 3/2015 | Trujillo | B25J 9/162 901/1 |
| 2015/0120043 | A1 | 4/2015 | Howard et al. | |
| 2016/0247404 | A1 * | 8/2016 | Srivastava | G08G 5/0069 |
| 2018/0056505 | A1 * | 3/2018 | Kuffner | G06N 3/008 |
| 2019/0337159 | A1 | 11/2019 | Tokuda | |
| 2020/0101611 | A1 * | 4/2020 | Ramanujam | G05B 17/02 |
| 2020/0171671 | A1 * | 6/2020 | Huang | B25J 9/0084 |
| 2020/0231386 | A1 * | 7/2020 | Shiu | B66F 9/063 |
| 2020/0286215 | A1 * | 9/2020 | Brill | G06T 7/001 |
| 2020/0376669 | A1 | 12/2020 | Ayaida | |
| 2020/0393841 | A1 * | 12/2020 | Frisbie | G05D 1/0221 |
| 2021/0048814 | A1 * | 2/2021 | Ghorbanian-Matloob | G05D 1/0027 |
| 2021/0116889 | A1 | 4/2021 | Keravala | |
| 2021/0323167 | A1 * | 10/2021 | Hemes | G05B 19/4083 |
| 2021/0407303 | A1 * | 12/2021 | Yogesha | G01W 1/10 |
| 2022/0048186 | A1 * | 2/2022 | Sharma | G06F 11/3006 |
| 2022/0147059 | A1 * | 5/2022 | Borne-Pons | G06Q 10/0631 |
| 2022/0171385 | A1 * | 6/2022 | Cui | H04W 4/46 |
| 2022/0171386 | A1 * | 6/2022 | Cui | G06Q 10/101 |
| 2022/0236748 | A1 * | 7/2022 | Parra Vilchis | G05D 1/104 |
| 2022/0245574 | A1 | 8/2022 | Cella | |
| 2022/0250658 | A1 | 8/2022 | Blonder | |
| 2022/0269287 | A1 | 8/2022 | Chen | |
| 2022/0300011 | A1 | 9/2022 | Chen | |
| 2022/0314448 | A1 | 10/2022 | Wales et al. | |
| 2022/0327351 | A1 | 10/2022 | Barello et al. | |
| 2023/0025714 | A1 | 1/2023 | Buckland | |
| 2023/0078448 | A1 | 3/2023 | Cella | |
| 2023/0083724 | A1 | 3/2023 | Cella | |
| 2023/0098602 | A1 | 3/2023 | Cella | |
| 2023/0102048 | A1 | 3/2023 | Cella | |
| 2023/0123322 | A1 | 4/2023 | Cella | |
| 2023/0127651 | A1 | 4/2023 | Cella | |
| 2024/0180383 | A1 | 6/2024 | Yamane | |

OTHER PUBLICATIONS

"Unmanned Life's Platform," Unmanned life, as of Aug. 14, 2022, 14 pages [retrieved online Apr. 26, 2023 from: https://web.archive.org/web/20220814062220/https://unmanned.life/technology/].

International Search Report and Written Opinion for International (PCT) Patent Application No. PCT/IB2023/000733, dated Mar. 27, 2024 14 pages.

Official Action for U.S. Appl. No. 18/077,965, dated May 1, 2025 41 pages.

Official Action for U.S. Appl. No. 18/077,967, dated Jan. 21, 2025 26 pages.

International Preliminary Report on Patentability for International (PCT) Patent Application No. PCT/IB2023/000733, dated Jun. 19, 2025 9 pages.

Official Action for U.S. Appl. No. 18/077,965, dated Sep. 5, 2025 60 pages.

Official Action for U.S. Appl. No. 18/077,967, dated Jul. 18, 2025 15 pages.

Official Action for U.S. Appl. No. 18/077,967, dated Oct. 30, 2025 42 pages.

Official Action for U.S. Appl. No. 18/077,965, dated Feb. 27, 2026 58 pages.

Official Action for U.S. Appl. No. 18/077,967, dated Feb. 26, 2026 40 pages.

* cited by examiner

Figure 3:
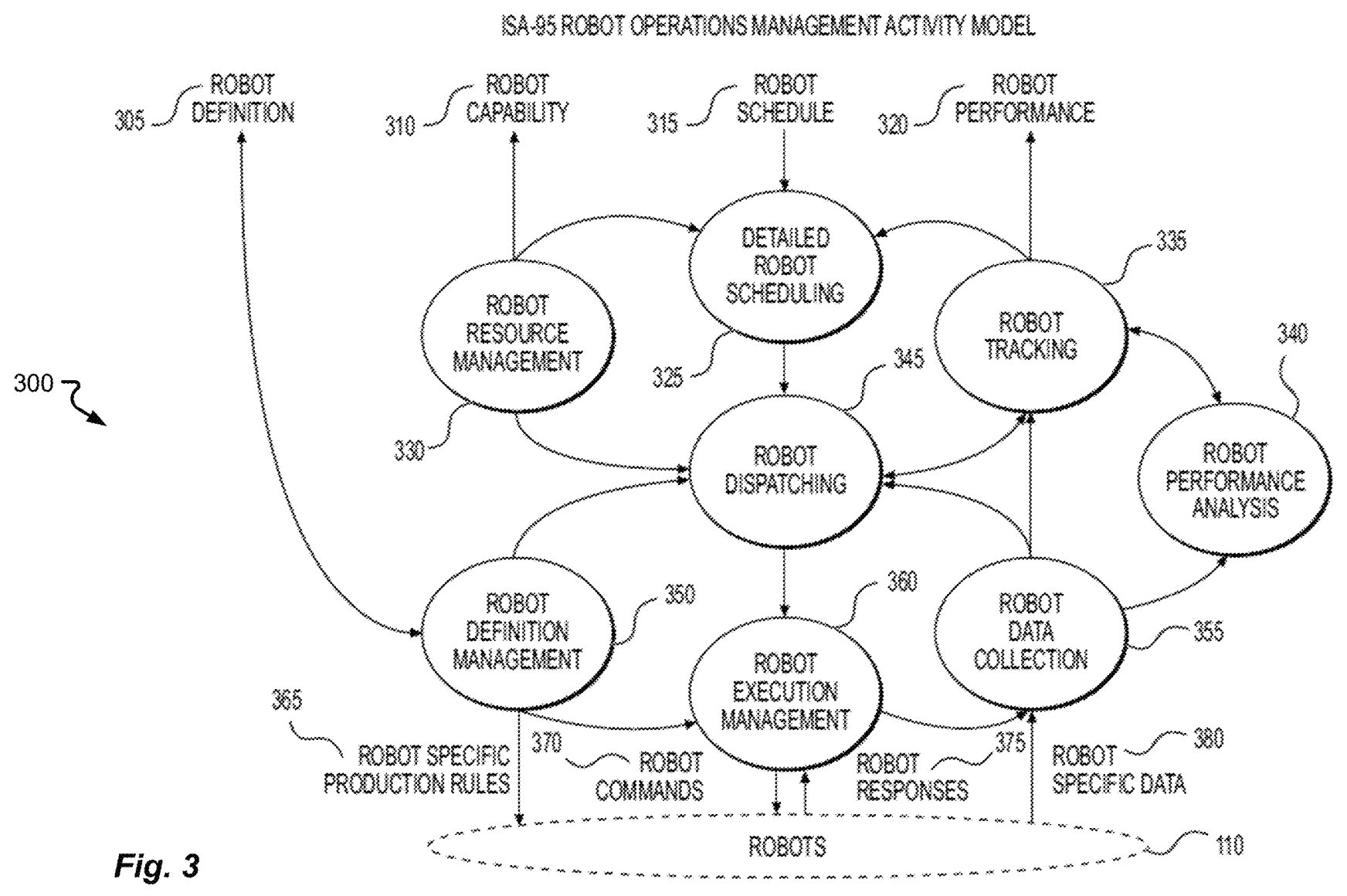

ISA-95 ROBOT OPERATIONS MANAGEMENT ACTIVITY MODEL

305 — ROBOT DEFINITION
310 — ROBOT CAPABILITY
315 — ROBOT SCHEDULE
320 — ROBOT PERFORMANCE
325 — DETAILED ROBOT SCHEDULING
330 — ROBOT RESOURCE MANAGEMENT
335 — ROBOT TRACKING
340 — ROBOT PERFORMANCE ANALYSIS
345 — ROBOT DISPATCHING
350 — ROBOT DEFINITION MANAGEMENT
355 — ROBOT DATA COLLECTION
360 — ROBOT EXECUTION MANAGEMENT
365 — ROBOT SPECIFIC PRODUCTION RULES
370 — ROBOT COMMANDS
375 — ROBOT RESPONSES
380 — ROBOT SPECIFIC DATA
110 — ROBOTS

Fig. 7

PATROL MANAGEMENT SYSTEM

CHECKLIST MANAGEMENT 718

SCHEDULE MANAGEMENT 720

CI SERVER 722

CHECKLIST EXECUTION MANAGEMENT 724

704

ROBOT MANAGEMENT SYSTEM

ROBOT FLEET MANAGEMENT 628

CI SERVER 722

ROBOT DATA ANALYSIS 642

ROBOT DATA MANAGEMENT 640

620

ROBOT COMMON INTERFACE 644

ROBOT A INTERFACE 742

ROBOT B INTERFACE 744

ROBOT C INTERFACE 746

110A

110B

110C

ROBOT A

ROBOT B

ROBOT C

672

700

OPERATION SUPPORT SYSTEM

PROCEDURE INFORMATION MANAGEMENT 714

PROCEDURE EXECUTION MANAGEMENT 716

CI SERVER 722

702

TASK MANAGEMENT SYSTEM

TRIGGER MANAGEMENT 725

TASK EXECUTION MANAGEMENT 726

CI SERVER 722

706

PROCESS CONTROL SYSTEM

CI SERVER 722

SCS 730

FCS 728

710

ROBOT CONTROLLER 748

RSP WEB DASHBOARD

RSP WEB DASHBOARD (ADMINISTRATOR) 1014

ROBOT

CONFIGURE ROBOT TYPE 1010

CONFIGURE ROBOT 1012

ROBOT STATUS 1016

SENSOR 1020

CONFIGURE AREA 1022

CONFIGURE SENSOR 1024

SENSOR STATUS 1026

GRAPHIC VIEW 1028

ALARM/EVENT 1040

EVENT

MISSION

CONFIGURE MISSION TEMPLATE 1030

CONFIGURE MISSION 1033

CONFIGURE MISSION LIST 1032

RUN MISSION 1036

MISSION HISTORY 1034

MISSION HISTORY (CONFIRMATION) 1038

1039

1000

1100

☰ RSP WEB DASHBOARD                                                    ♂ ♂ ♂ |

MISSION HISTORY

1210

| MISSION NAME | 2021-02-10 134123 WALK |
|---|---|
| DESCRIPTION | TASK FROM OM |
| ROBOT NAME | ROBOT 1 |
| START DATE | FEB. 12, 2021, 10:16 AM |
| FINISH DATE | FEB. 12, 2021, 10:17 AM |
| STATE | ✗ SUCCESSFULLY FINISHED |
| APPROVAL | · |

FEB. 12, 2021, 10:17 AM - PG003

1220

| SENSOR NAME | PG003 |
|---|---|
| SENSOR TYPE | GAUGE IMAGE |
| AI | AI                                              ▣ |
| AI ORIGINAL | NONE |
| RAW | |
| STATE | GOOD |
| FEEDBACK | FEEDBACK |

FEB. 12, 2021, 10:17 AM - PG002

1230

| SENSOR NAME | PG002 |
|---|---|
| SENSOR TYPE | ⊙ GAUGE IMAGE |
| AI | 0.0                                             ▣ |
| AI ORIGINAL | 0.0 |
| RAW | |
| STATE | GOOD |
| FEEDBACK | FEEDBACK |

[CONFIRM] [HISTORY CONFIRMATION LIST] [ NEXT ]

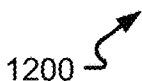
1200

*Fig. 12*

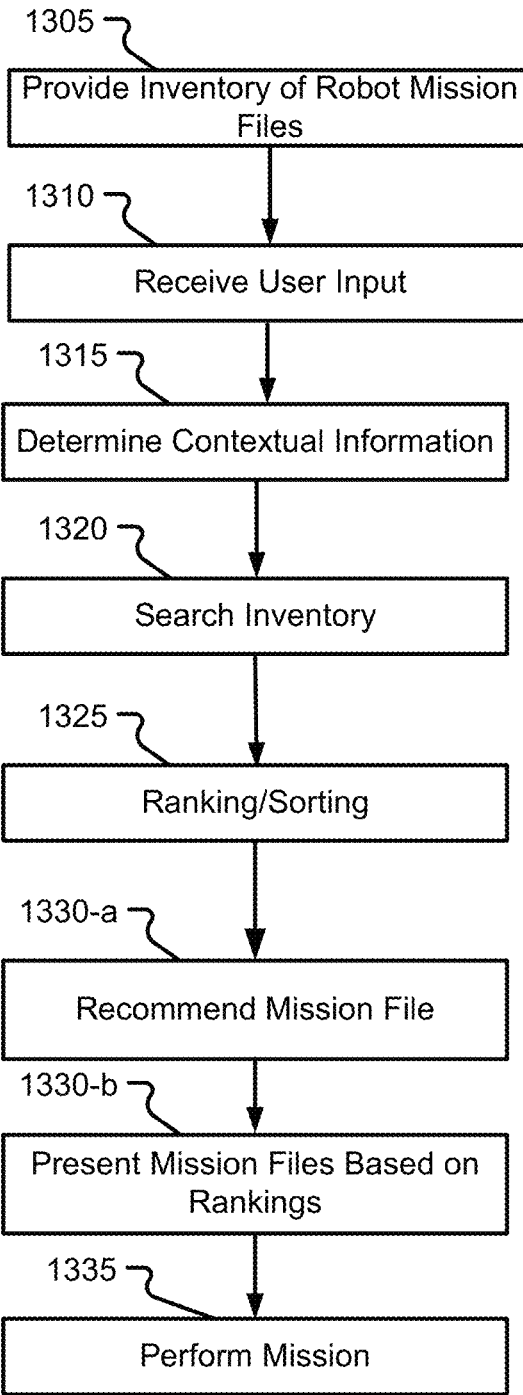
1305
Provide Inventory of Robot Mission Files
1310
Receive User Input
1315
Determine Contextual Information
1320
Search Inventory
1325
Ranking/Sorting
1330-a
Recommend Mission File
1330-b
Present Mission Files Based on Rankings
1335
Perform Mission
1300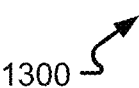
*Fig. 13*

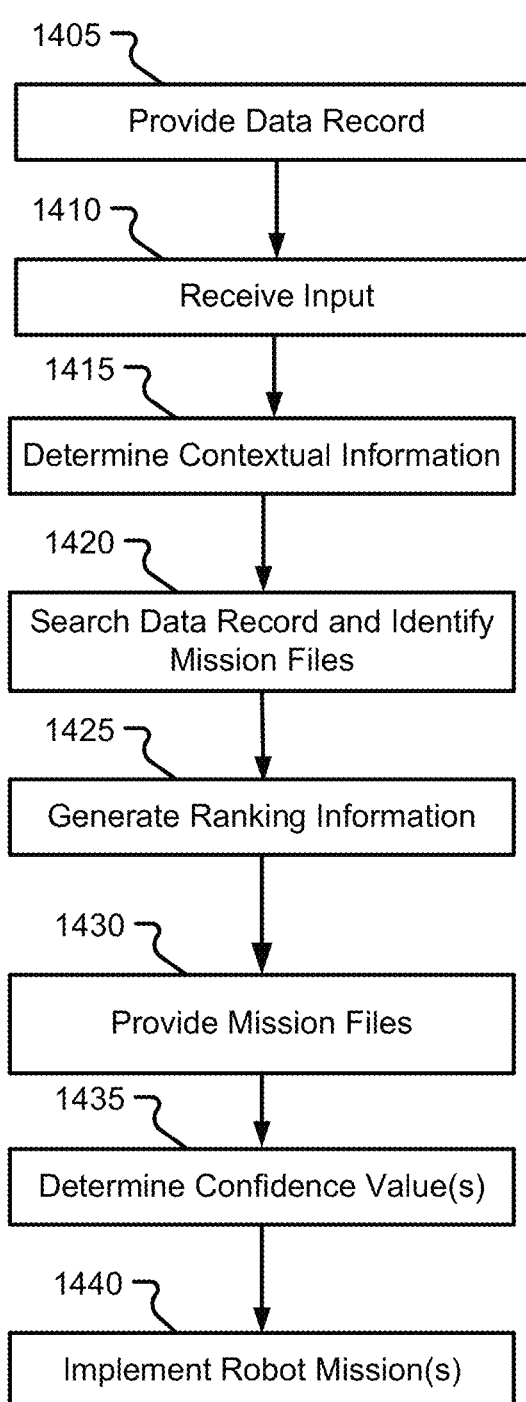
1405
Provide Data Record
1410
Receive Input
1415
Determine Contextual Information
1420
Search Data Record and Identify Mission Files
1425
Generate Ranking Information
1430
Provide Mission Files
1435
Determine Confidence Value(s)
1440
Implement Robot Mission(s)
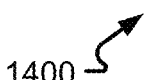
1400
*Fig. 14*

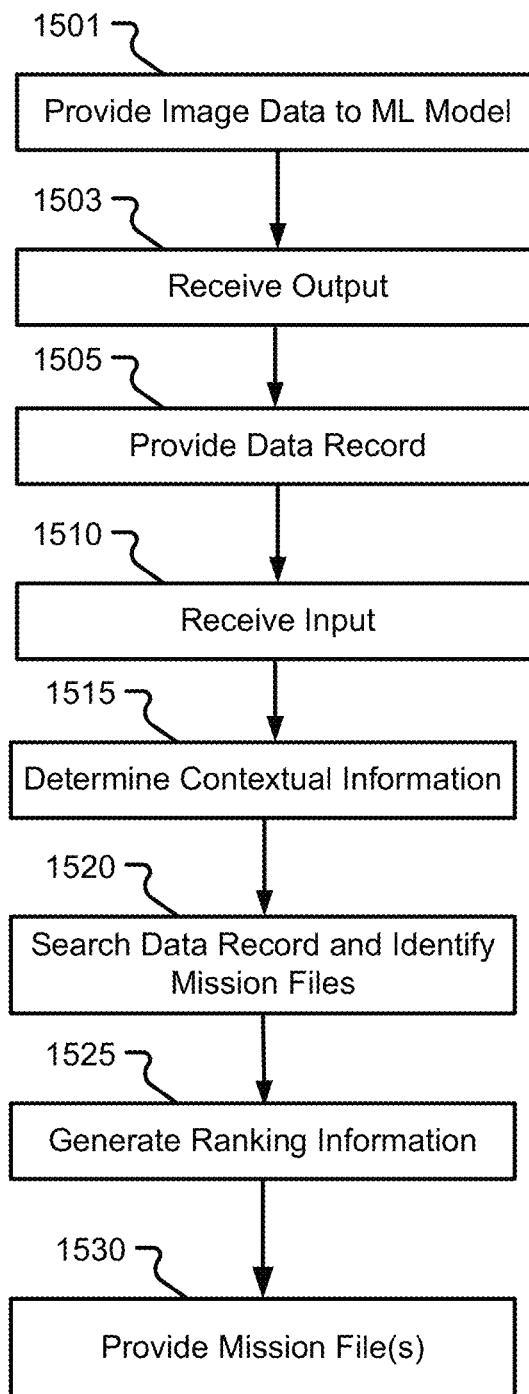
1501
Provide Image Data to ML Model
1503
Receive Output
1505
Provide Data Record
1510
Receive Input
1515
Determine Contextual Information
1520
Search Data Record and Identify Mission Files
1525
Generate Ranking Information
1530
Provide Mission File(s)
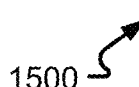
1500
*Fig. 15*

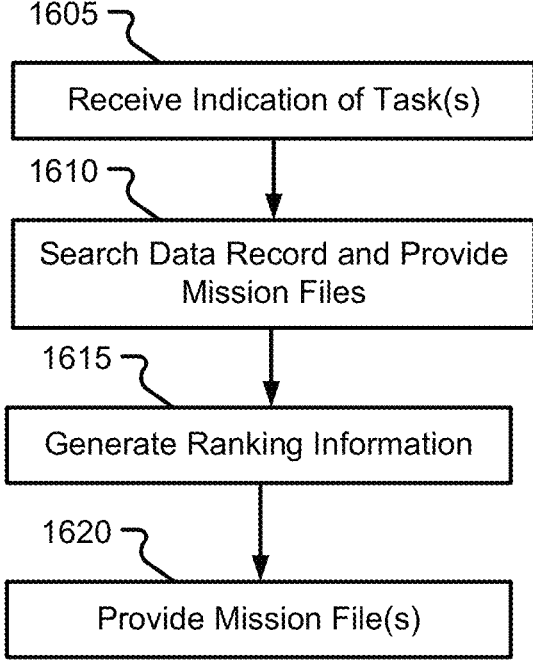
1605
Receive Indication of Task(s)
1610
Search Data Record and Provide Mission Files
1615
Generate Ranking Information
1620
Provide Mission File(s)
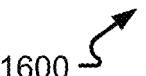
1600
*Fig. 16*

BUILDING A ROBOT MISSION BASED ON MISSION METRICS

FIELD OF TECHNOLOGY

The following relates to management of robot services in, for example, industrial facilities and more specifically, to building a robot mission based on mission metrics.

BACKGROUND

Industrial facilities, such as chemical factories, petroleum refineries, power generation plants, etc., may be extremely large and may involve a large number of simultaneous ongoing processes spread throughout the facility. Tasks to be completed in such facilities may include monitoring and adjusting equipment, sensing environmental or other conditions within the facility, and the like. Some facility operators are turning to robots for the completion of such industrial tasks. Improved techniques are desired for managing a fleet of robots in association with completing the tasks.

SUMMARY

The described techniques relate to improved methods, systems, devices, and apparatuses that support a robot management system or robot system platform. Generally, the described techniques provide for building a robot mission based on mission metrics.

A method is described including: providing a data record of mission files associated with a set of recorded robot missions; receiving an input from a user including an indication of one or more robot-agnostic tasks to be performed with respect to an environment; determining first contextual information associated with the one or more robot-agnostic tasks; searching the data record of the mission files and identifying, based on the search and the first contextual information, one or more mission files including one or more tasks that match the one or more robot-agnostic tasks; generating ranking information associated with the one or more identified mission files based on recorded metrics data associated with the one or more identified mission files; and providing the one or more identified mission files based on the ranking information.

A robot management system is described including: an interface to provide commands to a plurality of robot devices of one or more robot types; and a data repository including a data record of mission files associated with a set of recorded robot missions. The robot management system is to manage one or more robot missions and the plurality of robot devices by: receiving an indication of one or more robot-agnostic tasks to be performed with respect to an environment; determining first contextual information associated with the one or more robot-agnostic tasks; searching the data record of the mission files and identifying, based on the search and the first contextual information, one or more mission files including one or more tasks that match the one or more robot-agnostic tasks; generating ranking information associated with the one or more identified mission files based on recorded metrics data associated with the one or more identified mission files; and providing the one or more identified mission files based on the ranking information.

A robot system platform is described including: an interface to provide commands to a plurality of robot devices, wherein at least one robot device of the plurality of robot devices is independent of the robot system platform; a data repository including a data record of mission files associated with a set of recorded robot missions; and one or more circuits. The one or more circuits are to electronically receive an indication of one or more tasks to be performed with respect to an environment. The one or more tasks are absent an indication of at least one of: a target robot type associated with completing the one or more tasks; a target robot function in association with completing the one or more tasks; a target quantity of robot devices in association with completing the one or more tasks. The one or more circuits are to further search the data record of the mission files and provide, based on the search, one or more identified mission files corresponding to one or more recorded robot missions that at least partially completed the one or more tasks. The one or more circuits are to generate ranking information associated with the one or more identified mission files based on recorded metrics data associated with the one or more identified mission files and provide the one or more identified mission files based on the ranking information.

BRIEF DESCRIPTION OF THE DRAWINGS

FIG. 3 illustrates an example of a generalized model of robotics activity within an operations management system.

FIG. 7 illustrates an example of subsystems of an operations management system including a multivendor robotic services platform, according to one or more example embodiments.

FIG. 12 illustrates an example of feedback associated with a completed mission, according to one or more example embodiments.

FIGS. 13 through 16 illustrate example process flows in accordance with aspects of the present disclosure.

DETAILED DESCRIPTION

Figure 1:
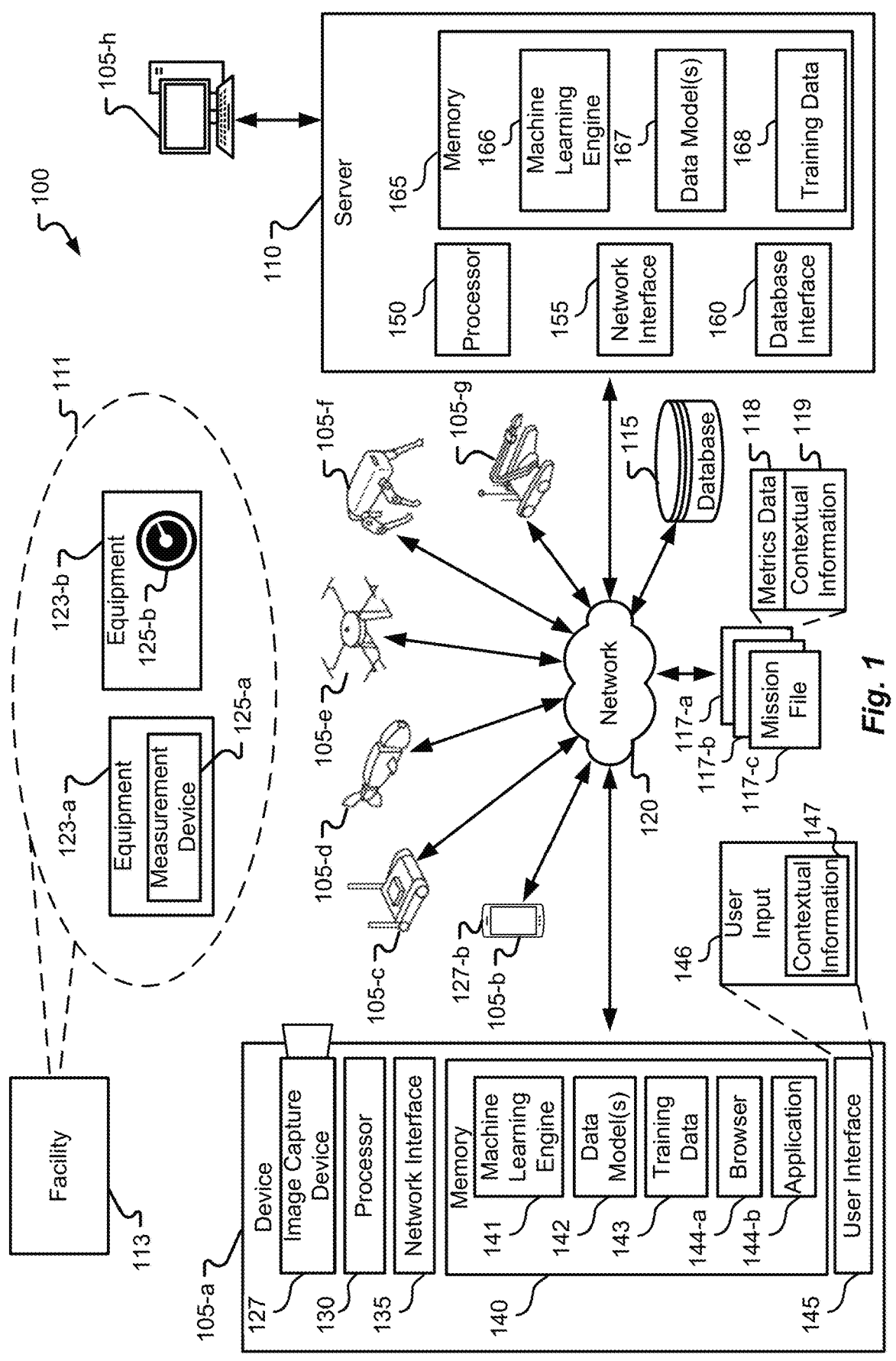
FIG. 1 illustrates an example of a system in accordance with aspects of the present disclosure.

Industrial facilities, such as chemical factories, petroleum refineries, power generation plants, etc., may be extremely large and may involve a large number of simultaneous ongoing processes spread throughout the facility. Tasks to be completed in such facilities may include monitoring and adjusting equipment, sensing environmental or other conditions within the facility, performing manufacturing tasks, and the like. Some of these tasks may require attention on a 24-hour per day schedule, and others may require exposure to potentially hazardous conditions or work in spaces that are confined or otherwise difficult to access.

Some facility operators are turning to autonomous mobile robots for the completion of such industrial tasks to, for example, reduce costs, increase facility up time, or protect human workers from potentially hazardous conditions. For example, some facilities may employ autonomous robots for industrial applications in accordance with the 4D principle, letting the robots do tasks that are dull, dirty, dangerous, or dear. That is, the tasks may include work that is repetitive, unhygienic, risky, or costly (e.g., where one cannot afford to make a mistake). However, the range of required tasks in a complex facility may require a number of robots of varying types and capabilities provided by different manufacturers. In some cases, the robots may not operate according to common protocols or commands, and may not communicate data by similar methods. Accordingly, integrating robot fleets into industrial facilities has become increasingly complex as the number of robots, robot types, and robot-assigned tasks increases. This complexity may be a significant barrier to the adoption of robots in industrial facilities.

Some robot management systems allow a user to transmit a series of commands to a robot to control the movement of the robot, record a command set, and later recreate the recorded action as a pre-defined action sequence (e.g., to be used in training operators).

However, such robot management systems may be specific to the vendor control software corresponding to the robot. For example, such robot management systems may lack integration with a robot service platform that can provide a robot-agnostic method of creating and recording sequences of commands as an inventory of mission files. In some cases, the robot management systems may be incapable of controlling a heterogeneous robot fleet using the inventory of mission files. The term "heterogeneous robot fleet" may refer to a fleet of robot devices of different device types, different capabilities and functionalities, different vendors, and the like. In some cases, a heterogeneous robot fleet may include robots controllable via an open source robot operating system (e.g., ROS robots 555 later described herein with reference to FIG. 5) and vendor-specific robots (e.g., non-ROS robots 565 later described herein with reference to FIG. 5).

Such robot management systems do not provide a generic method for a user to create a sequence of commands (e.g., to build a mission) for one or more robots from a robot fleet to execute. Instead, the robot management systems rely on a robot-specific controller to communicate a mission to each robot of a different type or a different vendor. Such reliance on robot-specific controllers may prevent the robot management systems from effectively coordinating missions among a robot fleet including robots of different types and/or robots from different vendors.

In some other cases, some robot management systems obligate the operator to identify a sequence of commands for one or more robots from a robot fleet to execute, rather than providing a data-based approach to building a mission. Accordingly, for example, the effectiveness of the sequence of commands relies on personal experience and ability of the operator and, in some cases, best guesses of the operator.

According to example aspects of the present disclosure, a robot service platform is described that supports a robot-agnostic method of creating and recording sequences of commands as an inventory of mission files. A mission file may include data corresponding to a mission described herein. Aspects of a robot management system described herein support remotely managing a heterogenous robot fleet using an inventory of previously-recorded missions.

The terms "mission file," "robot mission file," and "mission data file" may be used interchangeably herein. The terms "mission" and "robot mission" may be used interchangeably herein. The terms "metrics," "metrics data," and "metrics information" may be used interchangeably herein. The terms "robot management system" and "robotics management system" may be used interchangeably herein. The terms "robot" and "robot device" may be used interchangeably herein.

The robot-agnostic method may include controlling a heterogeneous robot fleet using the inventory of mission files. In some aspects, the robot-agnostic method may include evaluating one or more missions (e.g., multiple missions, all missions, a subset of missions, etc.) in the mission inventory to determine a variety of different metrics and, in some cases, recording the metrics as metadata of recorded mission files. Aspects of the present disclosure support applying the metrics in association with recommending missions based on a given set of contexts (e.g., contextual information associated with one or more tasks). The terms "metrics," "metrics data," and "metrics information" may be used interchangeably herein.

Aspects of the present disclosure may be implemented by a management system (e.g., system 100 later described with reference to FIG. 1, operations management system 200 and/or robotics management system 232 later described with reference to FIG. 2, etc.).

In some aspects, the metrics data for a completed mission may include quality of data acquired in association with the completed mission. For example, the management system may support evaluating images of equipment and measurement devices (e.g., gauges, junctions, etc.) for resolution and clarity. In some aspects, the management system may support machine learning models capable of generating confidence measures in response to processing the images. In some other aspects, the metrics data may include a temporal duration associated with completing a mission (e.g., time required to complete a mission), consumed power associated with completing a mission (e.g., power required to complete the mission), use cost of a robot in association with completing a mission (e.g., wear and tear on the robot), cost associated with running a mission, and/or an indication of whether a completed robot mission involved at least one manual intervention by an operator.

As described herein, the management system may collect and record metadata in association with a recorded mission. In some aspects, the metadata may include the metrics data described herein. The term "recorded mission" may refer to a completed mission (e.g., a fully completed mission, a partially completed mission, a failed mission, a mission in-progress, etc.) for which corresponding data has been recorded to a data repository (e.g., a data record of mission files).

In some other aspects, the metadata may include contextual information associated with recording and/or rerunning a mission (e.g., contexts in which the missions were recorded and/or rerun). For example, the contextual information may include an indication of the status of a facility when a mission was implemented. In an example, the contextual information may include an indication of whether the mission was implemented during plant operations (e.g., normal plant operations), maintenance operations, calibration operations, testing operations, or the like.

The metadata may include environmental factors associated with a recorded mission. Non-limiting examples of environmental factors include lighting conditions (e.g., amount of available light or lack thereof), temperature conditions, noise conditions, and surrounding weather conditions (e.g., sunny, cloudy, rainy, windy, etc. for cases of missions implemented in an outside environment).

The metadata may include state information of a facility and/or contextual information associated with the facility during prior recorded missions. In some aspects, the management system may generate an embedding from numerous data points corresponding to the facility. The management system may keep track of the embedding for comparison to one or more subsequent embeddings representing subsequent states of the facility (e.g., a current state of the facility).

In some aspects, for a prior recorded mission, the metadata may include contextual information associated with a robot (or robots) which performed the mission. Non-limiting examples of the contextual information associated with the robot include battery quality, odometer, weight, time since last maintenance, or other factors which can impact mission performance from the robot side.

In some aspects, the management system may use the metadata in association with tracking mission success and/or failure in one or more contexts. For example, the metadata may include an indication of whether a recorded mission satisfied or failed to satisfy one or more target criteria. In an example, for a recorded mission that satisfied or failed to satisfy one or more target criteria, the metadata may include contextual information for the recorded mission, contextual information for one or more tasks of the recorded mission, and/or contextual information associated for a facility associated with the recorded mission.

As described herein, the management system may determine and record metrics data as metadata of recorded mission files. The management system may use the metrics data (e.g., refer to the metrics data) to recommend a mission (or missions) in particular contexts. In an example, the management system may determine a current context based on an urgency of a task(s) to be performed, time considerations or time constraints (e.g., before facility shutdown at 9:00 pm), a target level of accuracy, other tasks for which a robot(s) may be assigned or allocated to implement, conditions associated with a facility where the task(s) is to be performed, and the like.

In an example implementation, the management system may extract metrics data corresponding to recorded missions from metadata of recorded mission files. Based on the metrics data corresponding to the recorded missions, the management system may match one or more of the recorded robot missions (and/or tasks included therein) to the current context.

In another example implementation, a first recorded mission (e.g., mission 1) may have higher quality pictures in comparison to a second recorded mission (e.g., mission 2). Further, for example, the first mission may have a relatively higher cost associated with completion (e.g., uses more battery life) and/or a relatively longer time to complete compared to the second recorded mission. In an example, the management system may recommend and/or select (e.g., autonomously select) the first mission if accuracy of measurement readings (e.g., from captured images) is of higher priority. In another example, the management system may recommend and/or select (e.g., autonomously select) the second mission if completion time and/or battery life is of higher priority.

Additionally, or alternatively, the management system may select (e.g., semi-autonomously select) the first mission or the second mission in combination with operator confirmation. For example, the management system may provide a recommended mission (or missions) to the operator (e.g., a human operator), and the management system may command one or more robot devices to implement the mission in response to operator confirmation. In some cases, the management system may save the decision to a machine learning model, and the management system may utilize the machine learning model to improve decision making (e.g., recommended missions) for future tasks.

Aspects of the disclosure are described in the context of an environment such as an industrial facility, a processing facility, a processing plant, a factory, etc. It should be appreciated, however, that embodiments of the present disclosure are not limited to deployment in these types of environments. In some cases, the techniques described herein support building a mission based on mission metrics in any type of environment.

Examples of processes that support building a robot mission based on mission metrics are described herein. Aspects of the disclosure are further illustrated by and described with reference to apparatus diagrams, system diagrams, and process flows.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in the Detailed Description provided herein.

Systems for Managing a Robot Fleet

FIG. 1 illustrates an example of a system 100 according to aspects of the present disclosure. In some examples, the system 100 may support building and managing robot missions with respect to an environment 111 and/or a facility 113. The system 100 may be a robot management system (also referred to herein as a robot system platform) or an operations management system, example aspects of which are later described herein.

In some examples, the environment 111 may correspond to one or more regions included in the facility 113. In some alternative and/or additional examples, the environment 111 may correspond to one or more regions surrounding (e.g., exterior to) the facility 113. Additionally, or alternatively, example aspects of the techniques described herein may be applied to other environments in which equipment may be monitored, maintained (e.g., repaired), and/or operated such as, but not limited to, a city environment, a residential environment, commercial locations (e.g., office buildings or businesses), a hospital environment (e.g., in a hospital room(s)), a lab environment (e.g., a lab, a cleanroom, etc.), or the like.

In some aspects, the system 100 may be a distributed process control system capable of executing and controlling processes associated with manufacturing, conversion, production, system monitoring, equipment monitoring, other processing, or the like. In some examples, the system 100 may be a distributed process control system including controllers (e.g., implemented by a device 105 and/or a server 110) connected to equipment 123 that is monitored by measurement devices 125 described herein. In some other examples, the system 100 may be a distributed control system including controllers (e.g., implemented by a device 105 and/or a server 110) capable of controlling devices 105 for extracting measurement information from the measurement devices 125. The devices 105 may support extracting measurement information through capturing, processing, and analyzing images of the measurement devices 125.

The system 100 may include a device 105 (or multiple devices 105), a server 110, a database 115, a communication network 120, equipment 123, and measurement devices 125. The device 105 may be a wireless communication device (e.g., device 105-*b*). Non-limiting examples of the device 105 may include, for example, personal computing devices or mobile computing devices (e.g., laptop computers, mobile phones, smart phones, smart devices, wearable devices, tablets, etc.). In some examples, the device 105 may be operable by or carried by a human user. In some aspects, the device 105 may perform one or more operations autonomously or in combination with an input by the user, the device 105, and/or the server 110.

In some aspects, the device 105 may be a transport instrument configured to move about the environment 111. For example, the device 105 may be a motorized robot or drone (e.g., device 105-*c* through device 105-*g*), a mobile vehicle, or the like. In another example, the device 105 may be electronically and/or mechanically coupled to a transport instrument. In an example, movement of the device 105 (e.g., device 105-*c* (a motorized robot or drone), a device 105 coupled to a transport instrument, etc.) may be controlled by the system 100 (e.g., via commands by the device 105 or the server 110). In some other aspects, movement of the device 105 (or transport instrument) may be autonomous or semi-autonomous (e.g., based on a schedule or programming).

Aspects of the present disclosure support instructing devices 105 (e.g., device 105-*c* through device 105-*g*) to implement one or more tasks associated with the environment 111 or a target area(s) of the environment 111. In some cases, the system 100 may support implementations of instructing devices 105 (e.g., device 105-*c* through device 105-*g*) to autonomously perform one or more missions. In some cases, performing a mission (or combination of missions) may include performing one or more tasks. Additional and/or alternative aspects of the present disclosure support instructing a user, via a device 105 (e.g., device 105-*b*) to perform one or more missions (and an included task(s)) associated with the environment 111 or the target area(s) of the environment 111.

It is to be understood that a mission described herein may be performed and completed using a single robot device (e.g., device 105-*c*) or multiple robot devices (e.g., two or more of device 105-*c* through device 105-*g*). In some aspects, a mission may be a "compound" mission including a task list of multiple tasks. In some cases, a "compound" mission may include multiple missions, and each of the missions may include a respective task list of one or more tasks. In an example, given a task list associated with a mission (e.g., a compound mission), the system 100 may support mission selection logic instructing and sending out a device 105 (e.g., device 105-*c*) or multiple devices 105 (e.g., device 105-*c* through device 105-*g*) to perform the tasks included in the task list.

In some aspects, the mission selection logic may support instructing multiple devices 105 to perform the tasks simultaneously. In some other aspects, the mission selection logic may support instructing multiple devices 105 to perform the tasks based on an ordering. In an example, the ordering may be a sequential order in which a first task is completed, followed by one or more subsequent tasks. In some other examples, the mission selection logic may support instructing multiple devices 105 to perform the tasks based on an ordering in which tasks performed by different devices 105 partially overlap (e.g., with respect to time, percentage of completion of a task, etc.).

Aspects of the mission selection logic described herein may support a singular robot device (e.g., device 105-*c*) performing a set of actions assigned to the robot device. In some other aspects, the mission selection logic may support weighing and considering simultaneous robot tasks to find the best combination of robot tasks for completing a larger mission (e.g., compound mission). For example, the mission selection logic may apply respective weight factors to the robot tasks. In an example, a weight factor for a given robot task may be indicative of the contribution of the robot task to completing the larger mission. In some aspects, the weight factor may be indicative of the relative importance (e.g., priority) of the robot task in association with completing the larger mission.

It is to be understood that the example implementations described herein using a single robot device for performing one or more missions may support implementations using multiple robot devices for performing one or more missions (e.g., a single multi-robot compound mission, multiple multi-robot compound missions, etc.). Example aspects of the missions and tasks are later described herein.

Example tasks include capturing an image(s) of one or more equipment 123 (e.g., equipment 123-*a*, equipment 123-*b*, etc.). Other example tasks may include capturing an image(s) of a measurement device 125 (e.g., measurement device 125-*a*, measurement device 125-*b*, etc.). In some cases, tasks may include measuring a reading at one or more measurement devices 125 (e.g., based on a captured image (s), by extracting data from a measurement device 125, etc.). Other non-limiting examples of tasks include general operation of equipment 123 in association with the facility 113, maintaining equipment 123 (e.g., maintenance operations), repairing equipment 123 (e.g., repair operations), lifting and/or moving equipment 123, and the like.

The server 110 may be, for example, a cloud-based server. In some aspects, the server 110 may be a local server connected to the same network (e.g., LAN, WAN) associated with the device 105. The database 115 may be, for example, a cloud-based database. In some aspects, the database 115 may be a local database connected to the same network (e.g., LAN, WAN) associated with the device 105 and/or the server 110. The database 115 may be supportive of data analytics, machine learning, and AI processing.

The database 115 may include an inventory of devices 105 included in the system 100. In some aspects, the database 115 may include a data record of capabilities, functionalities, vendor information, and operation status associated with each of the devices 105. For example, the database 115 may include an indication that device 105-*b* is a mobile computing device and that device 105-*c* through device 105-*g* are robot devices or drones. The database 115 may include a data record of respective mobility types (e.g., fly, crawl, walk, etc.) and/or payload types (e.g., headlight, arm, camera, other sensors, etc.) associated with device 105-*c* through device 105-*g*.

In some examples, each device 105 may include an identification tag (e.g., electronic and/or physical). An identification tag may include identification information (e.g., a tag ID including a combination of letters, numbers, and/or symbols) and/or configuration information (e.g., device type, device parameters, device characteristics, device features, device capabilities, etc.) associated with a device 105. The database 115 may include a data record associating each identification tag with a corresponding device 105.

The system 100 may include a data record of mission files 117. The mission files 117 may be stored in the database 115, another database (e.g., different from database 115), or some other memory (e.g., memory 140, memory 165, etc.). In some examples, the mission files 117 may correspond to the missions described herein (e.g., general operation of equipment 123, maintenance operations, repair operations, etc.). In an example, each mission file 117 may include a corresponding mission and one or more tasks associated with the mission.

The communication network 120 may facilitate machine-to-machine communications between any of the devices 105, the server 110, equipment 123, measurement devices 125, or one or more databases (e.g., database 115). The communication network 120 may include any type of known communication medium or collection of communication media and may use any type of protocols to transport messages between endpoints. The communication network 120 may include wired communications technologies, wireless communications technologies, or any combination thereof.

The Internet is an example of the communication network 120 that constitutes an Internet Protocol (IP) network consisting of multiple computers, computing networks, and other communication devices located in multiple locations, and components in the communication network 120 (e.g., computers, computing networks, communication devices) may be connected through one or more telephone systems and other means. Other examples of the communication network 120 may include, without limitation, a standard Plain Old Telephone System (POTS), an Integrated Services Digital Network (ISDN), the Public Switched Telephone Network (PSTN), a Local Area Network (LAN), a Wide Area Network (WAN), a wireless LAN (WLAN), a Session Initiation Protocol (SIP) network, a Voice over Internet Protocol (VOIP) network, a cellular network, and any other type of packet-switched or circuit-switched network known in the art. In some cases, the communication network 120 may include of any combination of networks or network types. In some aspects, the communication network 120 may include any combination of communication mediums such as coaxial cable, copper cable/wire, fiber-optic cable, or antennas for communicating data (e.g., transmitting/receiving data).

In an example in which the system 100 is associated with an industrial facility (e.g., processing facility, a processing plant, a factory), the equipment 123 may include any equipment associated with the industrial facility. For example, the equipment 123 may include any type of equipment having a measurable parameter. In some aspects, the measurable parameters may be associated with performance of the equipment 123 and/or resource (e.g., power, gas, water, etc.) usage of the equipment 123. Example measurable parameters include, but are not limited to, pressure, fluid level, a mass flow rate (e.g., kg/H), temperature, power usage, gas usage, etc. In some other aspects, the measurable parameters may be associated with available or remaining contents (e.g., available power, available liquid, available gas, etc.) at the equipment 123.

The measurement devices 125 (e.g., measurement device 125-*a*, measurement device 125-*b*, etc.) may include field devices capable of monitoring or measuring the parameters associated with the equipment 123. In some aspects, a measurement device 125 may include a meter (e.g., an analog meter dial, an analog gauge, a digital meter, a digital gauge, a level meter, etc.) corresponding to a parameter value measurable by the measurement device 125. The meter, for example, may be located on a meter face of the measurement device 125. In some other aspects, a measurement device 125 may include multiple meter dials respectively corresponding to parameter values measurable by the measurement device 125. In some cases, the multiple meter dials may correspond to a same parameter value, but different respective equipment 123.

In some aspects, for a meter such as an analog meter dial, the meter dial may include a measurement indicator (e.g., a dial indicator) which points to a number (or marking) on the meter dial based on a parameter value (e.g., equipment performance, resource usage, available contents at equipment 123, etc.) measured by the measurement device 125. In some other aspects, for a meter such as a digital display, one or more numerical indicators on the digital display may reflect a parameter value measured by the measurement device 125.

In some cases, the measurable parameters may be associated with available or remaining contents (e.g., available liquid, available gas, etc.) at the measurement device 125. For example, a measurement device 125 may be a stand-alone device capable of indicating available resources at the measurement device 125, such as available energy, available liquid, available gas, available time (e.g., in the case of a timer, etc.), or the like.

In an example in which the system 100 is associated with an industrial facility (e.g., a processing facility, a processing plant, a factory, etc.), a hospital environment, a lab environment, or the like, the measurement devices 125 included in the environment 111 may include flow meters, pressure gauges, level meters, temperature gauges, etc. In some cases, the measurement devices 125 may be mechanically coupled to the equipment 123.

The system 100 may be associated with a residential or commercial setting. For example, the measurement devices 125 included in the environment 111 may include any type of measurement device 125 capable of providing measured or tracked information. For example, in a residential or a commercial setting, the measurement devices 125 may include analog utility meters (e.g., utility meters not connected to the communications network 120) such as, for example, gas meters, electric meters, etc. In some cases, the measurement devices 125 may include parking meters having an analog measurement indicator (e.g., an analog meter dial, a pointer) or digital measurement indicator (e.g., a digital display).

In some examples, each measurement device 125 may include an identification tag. An identification tag may include identification information (e.g., a tag ID including a combination of letters, numbers, and/or symbols) and/or configuration information (e.g., device type, device parameters, device characteristics, device features) associated with a corresponding measurement device 125.

In some aspects, the measurement devices 125 may not be connected to the communications network 120. For example, in some cases, the measurement devices 125 may not support network capability for communicating over the communications network 120. Aspects of the present disclosure may include missions that include tasks such as automated (and/or semi-automated) meter readings of the measurement devices 125 based on captured images of the measurement devices 125, repair and/or replacement of the measurement devices 125, and the like, examples of which are described herein.

In some other aspects, the measurement devices 125 may support network capability for communications with other devices (e.g., device 105, server 110, etc.) using the communications network 120 (e.g., via protocols supported by the communications network 120). For example, the measurement devices 125 may support communicating measurement data to a device 105, the server 110, etc. over the communications network 120. In some examples, the measurement devices 125 may include internet-of-things (IOT) devices inclusive of an analog meter dial, a digital meter, and/or a level meter described herein.

Aspects of the present disclosure may support missions that include tasks such as automated meter readings of the measurement devices 125 (e.g., of meters included in the measurement devices 125) using captured images of the measurement devices 125, for example, for cases in which communications of the communications network 120 are disrupted (e.g., due to network issues, blocked network communications, transceiver malfunction at the measurement device 125, etc.). For example, for cases in which communications of the communications network 120 are disrupted, the system 100 and/or an operator may build and implement a mission in which included tasks include automated inspection of the equipment 123, automated meter readings of the measurement devices 125, or the like.

In various aspects, settings of the any of the devices 105, the server 110, database 115, the communication network 120, the equipment 123, and the measurement devices 125 may be configured and modified by any user and/or administrator of the system 100. Settings may include thresholds or parameters described herein, as well as settings related to how data is managed. Settings may be configured to be personalized for one or more devices 105, users of the devices 105, and/or other groups of entities, and may be referred to herein as profile settings, user settings, or organization settings. In some aspects, rules and settings may be used in addition to, or instead of, parameters or thresholds described herein. In some examples, the rules and/or settings may be personalized by a user and/or administrator for any variable, threshold, user (user profile), device 105, entity, or groups thereof.

Aspects of the devices 105 and the server 110 are further described herein. A device 105 (e.g., device 105-*a*) may include an image capture device 127, a processor 130, a network interface 135, a memory 140, and a user interface 145. In some examples, components of the device 105 (e.g., processor 130, network interface 135, memory 140, user interface 145) may communicate over a system bus (e.g., control busses, address busses, data busses) included in the device 105. In some cases, the device 105 may be referred to as a computing resource.

The image capture device 127 may be a standalone camera device or a camera device integrated with the device 105. The image capture device 127 may support capturing static images and/or video. For example, the image capture device 127 may support autonomous capture of images (e.g., static images, video (and video frames thereof), a video stream (and video frames thereof), a video scan, etc.) In some examples, the image capture device 127 may be a camera installed at a fixed location (e.g., a CCTV camera).

In some aspects, the image capture device 127 may include a single image sensor or an array of image sensors (not illustrated). The image sensor(s) may include photodiodes sensitive (e.g., capable of detecting) to light of any frequency band(s). For example, the image sensor(s) may include any combination of photodiodes, photocathodes, and/or photomultipliers. The image sensor(s) may be configured to detect light within any defined wavelength range (e.g., visible spectrum, ultraviolet spectrum, etc.).

The image capture device 127 may be mechanically mounted to or within a housing of the device 105 in a manner that allows rotational degrees of freedom of the image capture device 127 and/or the image sensor. In another example, the image capture device 127 may be mounted to any surface or any object. In some aspects, the camera device may be a spherical camera device (e.g., for providing a spherical field of view).

The image capture device 127 (and/or image sensor) may include a location sensor configured to record location information associated with the image capture device 127 (and/or image sensor). In an example, the image capture device 127 may be configured to record and output coordinates, positioning information, orientation information, velocity information, or the like. For example, the image capture device 127 may include an accelerometer, a GPS transponder, an RF transceiver, a gyroscopic sensor, or any combination thereof.

The system 100 may support image processing techniques (e.g., image pre-processing) implemented at any of the device 105, the server 110, and the image capture device 127. Examples of image processing supported by the system 100 may include image reading, image resizing, image conversion (e.g., from gray to red, green, blue (RGB), from hue, saturation, value (HSV) to RGB, from blue, green red (BGR) to RGB, etc.), image enhancement (e.g., filtering with morphological operators), histogram equalization, denoising, linear contrast adjustment, median filtering, unsharp mask filtering, contrast-limited adaptive histogram equalization (CLAHE), affine transformation (e.g., geometric distortions correction), image transformation (e.g., Fourier transform, Hough transform, wavelet, etc.), color processing, or the like.

In some cases, the device 105 may transmit or receive packets to one or more other devices (e.g., another device 105, the server 110, the database 115, equipment 123, a measurement device 125 (if the measurement device 125 supports network communications)) via the communication network 120, using the network interface 135. The network interface 135 may include, for example, any combination of network interface cards (NICs), network ports, associated drivers, or the like. Communications between components (e.g., processor 130, memory 140) of the device 105 and one or more other devices (e.g., another device 105, the database 115, equipment 123, a measurement device 125 (if supportive of network communications)) connected to the communication network 120 may, for example, flow through the network interface 135.

The processor 130 may correspond to one or many computer processing devices. For example, the processor 130 may include a silicon chip, such as a FPGA, an ASIC, any other type of IC chip, a collection of IC chips, or the like. In some aspects, the processors may include a microprocessor, CPU, a GPU, or plurality of microprocessors configured to execute the instructions sets stored in a corresponding memory (e.g., memory 140 of the device 105). For example, upon executing the instruction sets stored in memory 140, the processor 130 may enable or perform one or more functions of the device 105.

The memory 140 may include one or multiple computer memory devices. The memory 140 may include, for example, Random Access Memory (RAM) devices, Read Only Memory (ROM) devices, flash memory devices, magnetic disk storage media, optical storage media, solid-state storage devices, core memory, buffer memory devices, combinations thereof, and the like. The memory 140, in some examples, may correspond to a computer-readable storage media. In some aspects, the memory 140 may be internal or external to the device 105.

The processor 130 may utilize data stored in the memory 140 as a neural network (also referred to herein as a machine learning network). The neural network may include a machine learning architecture. In some aspects, the neural network may be or include an artificial neural network (ANN). In some other aspects, the neural network may be or include any machine learning network such as, for example, a deep learning network, a convolutional neural network (CNN), or the like. Some elements stored in memory 140 may be described as or referred to as instructions or instruction sets, and some functions of the device 105 may be implemented using machine learning techniques. In some aspects, the neural network may include a region-based CNN (RCNN), fast-RCNN, faster-RCNN, and or mask-RCNN.

The memory 140 may be configured to store instruction sets, neural networks, and other data structures (e.g., depicted herein) in addition to temporarily storing data for the processor 130 to execute various types of routines or functions. For example, the memory 140 may be configured to store program instructions (instruction sets) that are executable by the processor 130 and provide functionality of machine learning engine 141 described herein. The memory 140 may also be configured to store data or information that is useable or capable of being called by the instructions stored in memory 140. One example of data that may be stored in memory 140 for use by components thereof is a data model(s) 142 (e.g., a neural network model, an object detection model, or other model described herein) and/or training data 143 (also referred to herein as a training data and feedback).

The machine learning engine 141 may include a single or multiple engines. The device 105 (e.g., the machine learning engine 141) may utilize one or more data models 142 for recognizing and processing information obtained from other devices 105, the server 110, and the database 115. In some aspects, the device 105 (e.g., the machine learning engine 141) may update one or more data models 142 based on learned information included in the training data 143. In some aspects, the machine learning engine 141 and the data models 142 may support forward learning based on the training data 143. The machine learning engine 141 may have access to and use one or more data models 142. The machine learning engine 141 may support image annotation, image augmentation, model selection, model training, performance analysis, and finetuning using any combination of data models 142 and/or training data 143.

The data model(s) 142 may be built and updated by the machine learning engine 141 based on the training data 143. The data model(s) 142 may be provided in any number of formats or forms. Non-limiting examples of the data model(s) 142 include Decision Trees, Support Vector Machines (SVMs), Nearest Neighbor, and/or Bayesian classifiers. Other example aspects of the data model(s) 142, such as generating (e.g., building, training) and applying the data model(s) 142, are described with reference to the figure descriptions herein.

According to aspects of the present disclosure, the data model(s) 142 may include an object detection model. In some aspects, the data model(s) 142 may be a single object detection model trained to detect equipment 123 and/or measurement devices 125 (e.g., meters) included in captured images of an environment 111. Aspects of the present disclosure may support training the data model(s) 142 a single time, even when equipment 123 and measurement devices 125 having similar visual features compared to registered equipment 123 and measurement devices 125 are added to the environment 111 (or registered with the system 100) for management by the system 100.

The data model(s) 142 may support management and detection of equipment 123 and/or measurement devices 125 of various types, designs, and/or various sizes. The data model(s) 142 may support detection of equipment 123 and measurement devices 125 included in captured images, regardless of capture angle and/or lighting conditions associated with capturing the images. In some aspects, the data model(s) 142 may support detection of equipment 123 and measurement devices 125 based on features having the highest distinction among equipment 123 and measurement devices 125. In some aspects, the data model(s) 142 may support image analysis techniques such as two-dimensional (2D) and three-dimensional (3D) object recognition, image classification, image segmentation, motion detection (e.g., single particle tracking), video tracking, 3D pose estimation, or the like.

In some examples, the training data 143 may include aggregated images of the environment 111, the facility 113, the equipment 123, and measurement devices 125. For example, the training data 143 may include captured images (e.g., images captured during a mission or task, etc.) of the environment 111 and registered images of measurement devices 125 (e.g., as captured during a previous mission or task). In some aspects, the training data 143 may include aggregated measurement data, such as aggregated measurement information (e.g., measurement values) associated with the measurement devices 125 with respect to one or more temporal periods. In some other aspects, the training data 143 may include aggregated measurement information associated with one or more missions or tasks implemented in association with the environment 111 and the measurement devices 125. In some other examples, the training data 143 may include parameters and/or configurations of devices 105 (e.g., robot devices) used in association with performing a mission or task, scheduling information associated with the mission or task, locations (e.g., of devices 105, equipment 123, etc.) associated with the mission or task, routes for performing a mission (e.g., routes taken by a device 105 in association with performing the mission), equipment 123 and/or measurement devices 125 monitored in association with a mission, and the like.

The machine learning engine 141 may be configured to analyze real-time and/or aggregated information (e.g., captured images of equipment 123 and/or measurement devices 125, measured values of measurement devices 125, calculated performance of equipment 123, etc.). In some cases, the machine learning engine 141 may support the calculation of predicted information (e.g., measured values at one or more measurement devices 125, performance at equipment 123, etc.). For example, the machine learning engine 141 may predict measurement information at a measurement device 125 based on historical data (e.g., previously recorded measurement information) associated with the measurement device 125. In some aspects, the machine learning engine 141 may predict performance trends (e.g., predicted efficiency, predicted energy usage, predicted life expectancy, predicted instances of repair, predicted flow rate, predicted pressure levels, etc.) associated with equipment 123. In some cases, the system 100 may adjust operating parameters associated with equipment 123 included in the environment 111 and/or notify an operator of any faults associated with the equipment 123 based on actual measured information and/or predicted measurement information. In some cases, the system 100 may adjust mission parameters and/or tasks associated managing the facility 113 and/or managing the equipment 123 based on actual measured information and/or predicted measurement information.

In some other aspects, the machine learning engine 141 may be configured to analyze and adjust parameters associated managing the facility 113 based on data collected during a mission or task. For example, the machine learning engine 141 may assign a task and/or build a mission based on a result associated with a completed a mission or task. In some cases, based on the result (e.g., a failed result due to image quality of captured images, a failed result due to an incomplete repair of equipment 123, etc.), the server 110 may control a device 105 (e.g., device 105-c, etc.), control a transport instrument, and/or output notifications to an operator (e.g., via device 105-a, etc.) to repeat the mission or task.

For example, for a mission that includes capturing images of equipment 123 and/or measurement devices 125, the server 110 may modify capture settings (e.g., capture angle, time of day, etc.) associated with capturing images of the equipment 123 and/or measurement devices 125. In some aspects, the server 110 may control a device 105, control a transport instrument, and/or output notifications to an operator to recapture an image of the equipment 123 and/or measurement device(s) 125. In another example, for a mission that includes repairing equipment 123 (e.g., equipment 123-a) and/or a measurement device 125 (e.g., measurement device 125-a), the server 110 may modify the type of robot device(s) used for the mission. For example, a failed mission may have been implemented using a robot device (e.g., device 105-c) incapable of flight. The server 110 may repeat the mission (or one or more tasks of the mission) using a robot device (e.g., device 105-e) that is capable of flight. In some other examples, a failed mission may have been implemented using a robot device (e.g., device 105-f) for which a deficiency with respect to payload (e.g., lack of articulated arms or ability to control a tool) resulted in the failed mission. The server 110 may repeat the mission (or one or more tasks of the mission) using a robot device (e.g., device 105-g) having a payload (e.g., articulated arms, a drill, etc.) capable of completing the mission.

Aspects of the present disclosure support mission and/or task selection by the server 110, for example, without a user indication of robot type and/or robot capability. For example, the server 110 may select and recommend a mission(s) to the user based on contextual information associated with target tasks indicated by the user. In some aspects, the server 110 may select and recommend a mission (s), from among recorded missions corresponding to the mission files 117, based on contextual information of the recorded missions. Example aspects of the contextual information are later described herein.

The machine learning engine 141 may analyze any information described herein that is historical or in real-time. The machine learning engine 141 may be configured to receive or access information from the device 105, the server 110, the database 115, the equipment 123, and/or the measurement devices 125 (e.g., via image capture and image analysis). The machine learning engine 141 may build any number of profiles such as, for example, profiles associated with the system 100 (e.g., profiles associated with a facility), profiles associated with a mission, profiles associated with equipment 123, profiles associated with a measurement device 125 (e.g., inclusive of configuration information described herein), etc. using automatic processing, using artificial intelligence and/or using input from one or more users associated with the device 105. The profiles may be, for example, configuration profiles, performance profiles, etc. The machine learning engine 141 may use automatic processing, artificial intelligence, and/or inputs from one or more users of the devices 105 to determine, manage, and/or combine information relevant to a configuration profile. In some aspects, the machine learning engine 141 may build any number of missions and configure one or more tasks for each mission.

The machine learning engine 141 may determine configuration profile information based on a user's interactions with information. The machine learning engine 141 may update (e.g., continuously, periodically, based on a trigger condition, etc.) configuration profiles based on new information that is relevant. The machine learning engine 141 may receive new information from any device 105, the server 110, the database 115, the equipment 123, the measurement devices 125 (e.g., via image capture, via the communications network 120 if the measurement device 125 supports network communications), etc. Profile information may be organized and classified in various manners. In some aspects, the organization and classification of configuration profile information may be determined by automatic processing, by artificial intelligence and/or by one or more users of the devices 105.

Examples of a user's interaction with information may include: choice of mission, choice of tasks, and/or choice of parameters (e.g., mission parameters, task parameters, etc.) based on type of facility 113, type of environment 111, types of equipment 123, types of measurement devices 125, and the like. Example aspects of the present disclosure support implementations in which the user's interaction is free from indicating a robot type and/or robot capability.

The machine learning engine 141 may create, select, and execute appropriate processing decisions. Example processing decisions may include analysis of measurement information (e.g., historical, real-time, etc.), predicted measurement information, configuration of a device 105, configuration of equipment 123, configuration of a measurement device 125, configuration of a mission, configuration of a task, and the like. Processing decisions may be handled automatically by the machine learning engine 141, with or without human input.

The machine learning engine 141 may store, in the memory 140 (e.g., in a database included in the memory 140), historical information (e.g., reference data, measurement data, predicted measurement data, configurations, etc.). Data within the database of the memory 140 may be updated, revised, edited, or deleted by the machine learning engine 141. In some aspects, the machine learning engine 141 may support continuous, periodic, and/or batch fetching of data (e.g., from equipment 123, measurement devices 125 (via image capture and/or the communications network 120), a central controller, devices 105, etc.) and data aggregation.

The device 105 may render a presentation (e.g., visually, audibly, using haptic feedback, etc.) of an application 144 (e.g., a browser application 144-a, an application 144-b). The application 144-b may be an application associated with building, executing, controlling, and/or monitoring a mission (or tasks thereof). For example, the application 144-b may enable control of the devices 105, equipment 123, and/or measurement devices 125 described herein. In some aspects, the application 144-b may be an application for building a robot mission based on mission metrics (e.g., of previously recorded missions), mission inventory, and target mission metrics (e.g., as input by an operator).

The application 144-b may support expression of a mission, a mission goal, and/or mission tasks in a human-readable format. In some aspects, the human-readable format may be different from a format (e.g., programming language, program code, etc.) that conforms to command protocols for controlling a robot device (e.g., device 105-c, etc.). For example, the human-readable format may be different from vendor-specific command protocols for controlling a robot device. The application 144-b may support the input of data, commands, and/or expressions that are robot-agnostic. In some aspects, the application 144-b may support the user input of tasks in "plain language" (e.g., "determine efficiency of all equipment in the facility," "identify equipment that may fail in the next month," "replace the X component in all equipment for which the X component is likely to fail in the next month," etc.).

In some aspects, the term "robot-agnostic" may refer to a definition of a mission goal, a task (e.g., a robot task), or a mission in an internal format common to the system 100. In some cases, the term "robot-agnostic" may refer to a definition of a mission goal, a task, or mission that is absent an indication of robot type and/or robot function.

In an example, the device 105 may render the presentation via the user interface 145 (also referred to herein as a robot-agnostic interface). The user interface 145 may include, for example, a display (e.g., a touchscreen display), an audio output device (e.g., a speaker, a headphone connector), or any combination thereof. In some aspects, the applications 144 may be stored on the memory 140. In some cases, the applications 144 may include cloud-based applications or server-based applications (e.g., supported and/or hosted by the database 115 or the server 110). Settings of the user interface 145 may be partially or entirely customizable and may be managed by one or more users, by automatic processing, and/or by artificial intelligence.

In an example, any of the applications 144 (e.g., browser application 144-a, application 144-b) may be configured to receive data in an electronic format and present content of data via the user interface 145. For example, the applications 144 may receive data from another device 105, the server 110, the database 115, equipment 123, and/or measurement devices 125 (if supportive of network communications) via the communications network 120, and the device 105 may display the content via the user interface 145.

The database 115 may include a relational database, a centralized database, a distributed database, an operational database, a hierarchical database, a network database, an object-oriented database, a graph database, a NoSQL (non-relational) database, etc. In some aspects, the database 115 may store and provide access to, for example, any of the stored data described herein.

The server 110 may include a processor 150, a network interface 155, database interface instructions 160, and a memory 165. In some examples, components of the server 110 (e.g., processor 150, network interface 155, database interface 160, memory 165) may communicate over a system bus (e.g., control busses, address busses, data busses) included in the server 110. The processor 150, network interface 155, and memory 165 of the server 110 may include examples of aspects of the processor 130, network interface 135, and memory 140 of the device 105 described herein.

For example, the processor 150 may be configured to execute instruction sets stored in memory 165, upon which the processor 150 may enable or perform one or more functions of the server 110. In some examples, the server 110 may transmit or receive packets to one or more other devices (e.g., a device 105, the database 115, another server 110) via the communication network 120, using the network interface 155. Communications between components (e.g., processor 150, memory 165) of the server 110 and one or more other devices (e.g., a device 105, the database 115, equipment 123, a measurement device 125, etc.) connected to the communication network 120 may, for example, flow through the network interface 155.

In some examples, the database interface instructions 160 (also referred to herein as database interface 160), when executed by the processor 150, may enable the server 110 to send data to and receive data from the database 115. For example, the database interface instructions 160, when executed by the processor 150, may enable the server 110 to generate database queries, provide one or more interfaces for system administrators to define database queries, transmit database queries to one or more databases (e.g., database 115), receive responses to database queries, access data associated with the database queries, and format responses received from the databases for processing by other components of the server 110.

The memory 165 may be configured to store instruction sets, neural networks, and other data structures (e.g., depicted herein) in addition to temporarily storing data for the processor 150 to execute various types of routines or functions. For example, the memory 165 may be configured to store program instructions (instruction sets) that are executable by the processor 150 and provide functionality of a machine learning engine 166. One example of data that may be stored in memory 165 for use by components thereof is a data model(s) 167 (e.g., any data model described herein, an object detection model, a neural network model, etc.) and/or training data 168.

The data model(s) 167 and the training data 168 may include examples of aspects of the data model(s) 142 and the training data 143 described with reference to the device 105. The machine learning engine 166 may include examples of aspects of the machine learning engine 141 described with reference to the device 105. For example, the server 110 (e.g., the machine learning engine 166) may utilize one or more data models 167 for recognizing and processing information obtained from devices 105, another server 110, the database 115, the equipment 123, and/or the image capture devices 127. In some aspects, the server 110 (e.g., the machine learning engine 166) may update one or more data models 167 based on learned information included in the training data 168.

In some aspects, components of the machine learning engine 166 may be provided in a separate machine learning engine in communication with the server 110.

Aspects of the subject matter described herein may be implemented to realize one or more advantages. The described techniques may support example improvements in association with controlling a heterogeneous robot fleet (e.g., a robot fleet of different robot types and capabilities, different robot vendors, etc.). Aspects of the techniques provide for issuing commands to the robot fleet through an indication of robot-agnostic tasks. In some cases, aspects of the system 100 provide a generic method for a user to create a sequence of commands (e.g., to build a mission) for one or more robot devices from a robot fleet to execute. Accordingly, for example, the system 100 supports implementations that reduce or eliminate any burden on an operator in association with coordinating missions among a robot fleet including robots of different types and/or robots from different vendors, as the operator may provide commands to the robots via robot-agnostic tasks input via the system 100. Further, for example, the system 100 supports a data record of completed robot missions, and the system 100 may configure and/or suggest one or more robot missions based on the robot-agnostic tasks input by the operator. Accordingly, for example, the effectiveness of the robot-agnostic tasks input by the operator is not hindered by personal experience and ability of the operator (e.g., with respect to operator knowledge of robot-specific commands, etc.).

An example implementation that supports building a robot mission based on a mission inventory is described herein. The system 100 may provide a data record (also referred to herein as a mission inventory) of mission files 117 associated with recorded robot missions. The data record may include metrics data 118 (e.g., performance data, temporal data, cost, etc.) associated with recorded robot missions, contextual information 119 associated with the recorded robot missions, and indications of whether a recorded robot mission satisfied previous target criteria (e.g., whether the mission was successful). In some aspects, the mission files 117 may include metadata, and the metadata may include any of the metrics data 118, contextual information 119, and indications of whether a recorded robot mission satisfied previous target criteria. Examples of the metrics data 118 and contextual information 119 are described herein.

The system 100 may receive a user input 146 including an indication of a target task (or tasks) to be performed with respect to the facility 113 and/or environment 111. Additionally, or alternatively, the system 100 may identify the target task autonomously and/or semi-autonomously, for example, using machine learning techniques described herein (e.g., based on an analysis of results of a previously recorded mission). The target task may be a robot-agnostic task as described herein. In some aspects, the target task may be a process automation inspection task.

The system 100 may determine contextual information 147 associated with the target task. In some examples, the contextual information 147 may include criteria (e.g., urgency of the task, etc.) associated with the user and/or criteria (e.g., time considerations or constraints, etc.) associated with the facility 113 and/or environment 111.

The system 100 may search the data record of the mission files 117. The system 100 may identify one or more mission files (e.g., from the mission files 117) that include a task that matches the target task of the user input 146. In some aspects, the system 100 may identify multiple mission files including a completed task matching the target task. In some cases, the system 100 may generate ranking information for the identified mission files and provide the mission files based on a ranked order. In some examples, the system 100 may rank the mission files using metrics data (e.g., metrics data 118) associated with completing the missions and/or completing the associated tasks.

The system 100 may provide the identified mission files to the user via the user interface 145. In some aspects, the system 100 may implement an identified mission file in response to a user input (e.g., user confirmation, user modification, etc.). Additionally, or alternatively, the system 100 may implement an identified mission file (or portion thereof)

automatically if a confidence value (e.g., as determined by the system 100) associated with the identified mission file satisfies a threshold confidence value.

An example implementation that supports building a robot mission based on the user interface 145 (e.g., a robot-agnostic GUI) is described herein. In association with a first mission, the system 100 may electronically receive a first set of commands associated with operating a first robot device (e.g., device 105-*c*) to perform a first set of tasks. The system 100 may record the first set of commands to a mission file 117-*a*. In association with a second mission (e.g., a subsequent mission), the system 100 may electronically receive a second set of commands associated with operating a second robot device (e.g., device 105-*d*) to perform a second set of tasks. The system 100 may record the second set of commands to a mission file 117-*b*.

The system 100 may identify a third set of tasks common to the first set of tasks and the second set of tasks. In some aspects, based on the third set of tasks, the system 100 may identify at least one robot capability common to the first robot device (e.g., device 105-*c*) and the second robot device (e.g., device 105-*d*). The system 100 may generate a mission file 117-*c* including the third set of tasks, for example, based on a mapping between the third set of tasks, the mission file 117-*a* (e.g., and the first set of tasks), and the mission file 117-*b* (e.g., and the second set of tasks).

Accordingly, for example, the system 100 may receive a search request (e.g., via a user input 146) indicating a target task(s). Additionally, or alternatively, the system 100 may identify the target task(s) autonomously and/or semi-autonomously, for example, using machine learning techniques described herein (e.g., based on an analysis of results of a previously recorded mission). If the system 100 identifies that the target task(s) is included in the third set of tasks, the system 100 may provide the mission file 117-*a* and/or the mission file 117-*b* to a user for user selection and/or confirmation. The user may select the mission file 117-*a* and/or the mission file 117-*b* to perform the target task(s). Additionally, or alternatively, the system 100 may provide the mission file 117-*c*, and the user may select the mission file 117-*c* in association with performing the target task(s).

An example implementation that supports building a robot mission based on a mission inventory (e.g., the data record of mission files 117) is described herein. The system 100 may identify a target task(s) to be performed with respect to the facility 113 and/or environment 111. For example, the system 100 may receive a user input 146 including an indication of the target task(s). Additionally, or alternatively, the system 100 may identify the target task(s) autonomously and/or semi-autonomously, for example, using machine learning techniques described herein (e.g., based on an analysis of results of a previously recorded mission, based on an analysis of respective conditions of the equipment 123, based on an analysis of a condition of the facility 113, etc.).

The system 100 may identify mission file 117-*a* based on the target task(s). In some aspects, the system 100 may identify one or more recorded tasks of the mission file 117-*a* that at least partially achieve a target goal associated with the target task(s). In an example, the system 100 may determine whether the one or more recorded tasks of the mission file 117-*a* will achieve the target goal. For example, the system 100 may determine whether the one or more recorded tasks of the mission file 117-*a* fully overlap the target task(s)). If the system 100 identifies that the one or more recorded tasks of the mission file 117-*a* would fully achieve the target goal, the system 100 may provide commands to a robot device (e.g., device 105-*c*) or multiple robot devices (e.g., device 105-*c*, device 105-*d*, etc.) in association with implementing the one or more recorded tasks. Additionally, or alternatively, the system 100 may provide an indication of the mission file 117-*a* to a user (e.g., via user interface 145), and the system 100 may provide commands to a robot device in response to a user confirmation of the mission file 117-*a*.

In another example, if the system 100 identifies that the one or more recorded tasks of the mission file 117-*a* would not fully achieve the target goal, the system 100 may identify another mission file (e.g., mission file 117-*b*) based on the target task(s). The system 100 may identify one or more recorded tasks of the mission file 117-*b* that at least partially achieve the target goal associated with the target task(s). In an example, the one or more recorded tasks of the mission file 117-*b* may overlap any target task(s) that are not overlapped by the one or more recorded tasks of the mission file 117-*a*. If the system 100 identifies that the recorded tasks of the mission file 117-*a* and the mission file 117-*b* would fully achieve the target goal, the system 100 may provide commands to a robot device (e.g., device 105-*c*) or multiple robot devices (e.g., device 105-*c*, device 105-*d*, etc.) in association with implementing the recorded tasks. Additionally, or alternatively, the system 100 may provide an indication of the mission file 117-*a* and the mission file 117-*b* to the user (e.g., via user interface 145), and the system 100 may provide commands to a robot device in response to a user confirmation of the mission file 117-*a* and the mission file 117-*b*.

In the example aspects described herein for building a robot mission, the task list may include any quantity of tasks, and the task list may include any task type. For example, the system 100 may set a task as a target task to be performed, based on a set of criteria. In some examples, the system 100 may determine, as a target task, any task which meets target criteria associated with being a dull (e.g., repetitive), dirty (e.g., unhygienic), dangerous (e.g., presents a safety risk to a human operator), and/or dear (e.g., costly) task. In some aspects, the system 100 may determine target tasks based on a threshold value for determining whether a task is a dull (e.g., repetitive), dirty (e.g., unhygienic), dangerous (e.g., presents a safety risk to a human operator), and/or dear (e.g., costly) task.

An example threshold value for determining (e.g., classifying) a task as a dull (e.g., repetitive) task may be a threshold quantity of times that the task is performed over a temporal period. Examples of target criteria for determining the task as a dull (e.g., repetitive) task may be an indication of whether the candidate task can be successfully performed by a robot device, whether the candidate task can be more efficiently performed by the robot device (e.g., performed a larger quantity of times over the same temporal period), and the like. An example of target criteria for determining a task as a dirty (e.g., unhygienic) task may include whether the task is associated with waste disposal, waste cleanup, or the like. Another example of target criteria may include a classification (e.g., hazardous, toxic, etc.) associated with the waste.

An example threshold value for determining a task as a dangerous task (e.g., presents a safety risk to a human operator) may include a degree of safety risk to a human operator, a quantity of times a human operator has been injured performing the task with respect to a temporal period and/or quantity of missions, or the like. An example of target criteria for determining a task as a dangerous task may include environmental conditions associated with the task (e.g., accessibility of equipment associated with the task, temperature conditions associated with the equipment and the task, etc.). An example threshold value for determining a task as a dear task (e.g., costly) may include a cost (e.g., a financial cost). The threshold values and target criteria described herein are examples, and aspects of the present disclosure are not limited thereto.

Figure 2:
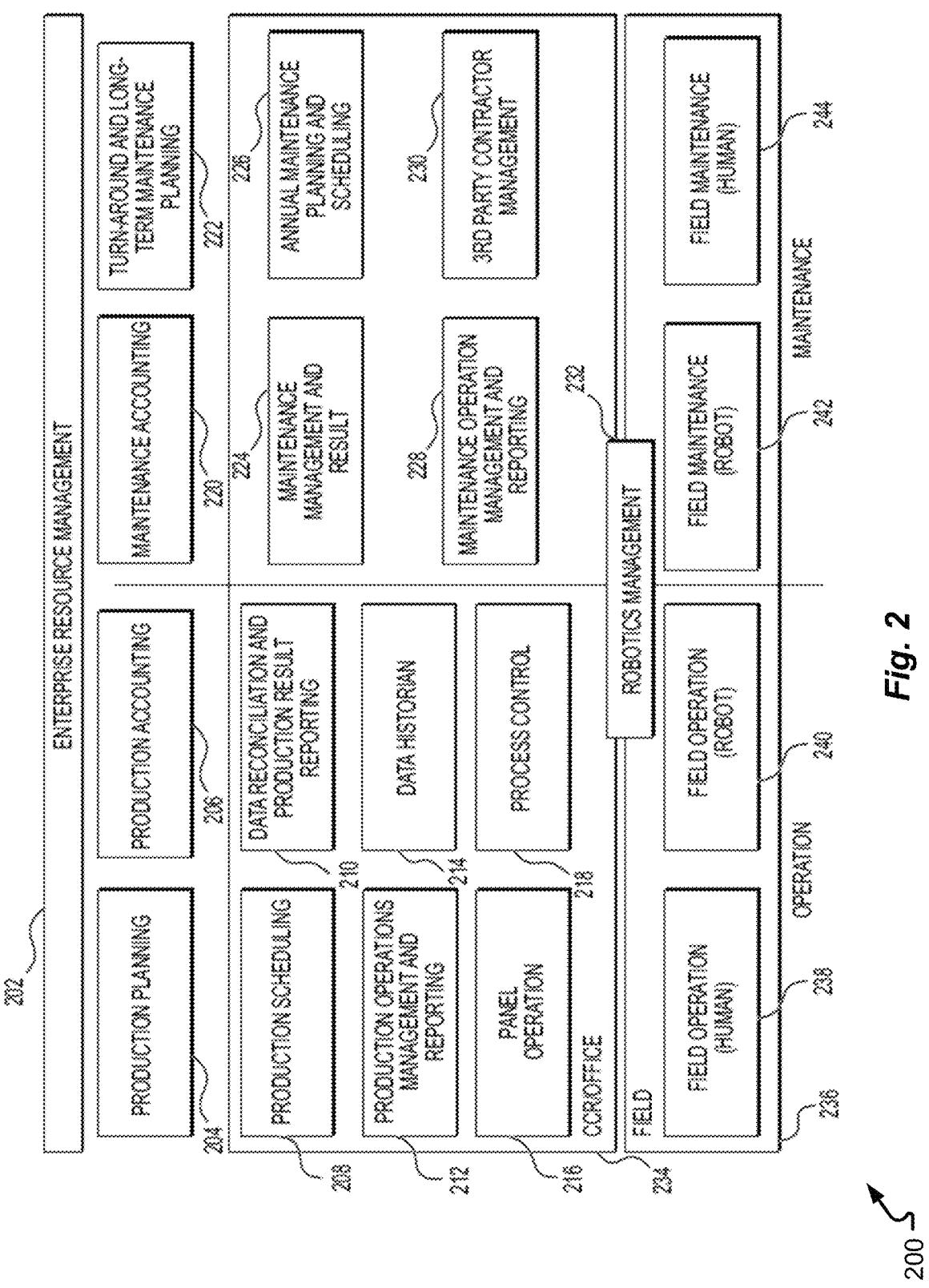
FIG. 2 illustrates an example of tasks and components of an operations management system for an industrial facility.

FIG. 2 depicts tasks and components of an operations management system 200 for the industrial facility 113. Operation of industrial facility 113 may include tasks and components related to operation of the facility, monitoring of safety or other conditions within the facility, and maintenance of the facility. Overall operations may be managed by an enterprise resource management system 202, which may control tasks such as, for example, production planning 204, production accounting 206, maintenance accounting 220, and planning of both turn-around maintenance and long-term maintenance 222.

Tasks for the operation and maintenance of the industrial facility 113 may be performed in an operations office or central control room (CCR) 234, or in the field 236, such as within the production area of the industrial facility 113 itself.

Operations-related tasks performed within the office/CCR 234 may include, for example, production scheduling 208, data reconciliation and production result reporting 210, production operations management and reporting 212, a data historian 214, panel operation 216, and process control 218.

Maintenance-related tasks performed within the office/CCR 234 may include, for example, maintenance and reliability management, and result reporting 224, annual maintenance planning and scheduling 226, maintenance operation management and reporting 228, and third party contractor management 230. Operations-related tasks performed in the field 236 may include, for example, human-performed operations tasks 238 and robot-performed operations tasks 240. Maintenance-related tasks performed in the field 236 may include, for example, human-performed maintenance tasks 242, and robot-performed maintenance tasks 244.

Robot-performed operations tasks 240 and robot-performed maintenance tasks 244, as well as other robot-performed tasks, may be managed by a robotics management system 232. Exemplary embodiments of one or more such robotics management systems will be discussed in greater detail below.

Robots acting within an operations management system may require additional information and metadata about each of the robots and robot activities within the system, including robot management, tracking, and analysis of the robots and their activities. For example, robots may require information about other robots and their activities when multiple robots are cooperating on an activity or when the activities of multiple robots may conflict. FIG. 3 depicts a generalized model 300 of robotics activity within an operations management system, based on the ISA-95 standard for "Enterprise-Control System Integration" (https://www.isa.org/standards-and-publications/isa-standards/isa-standards-committees/isa9 5).

Management of robots 110 functioning within an industrial facility 113, including robot-performed operations tasks 240 and robot-performed maintenance tasks 244, may relate to activities performed by robots 110, data related to robots 110 and the tasks performed, operations performed by robotics management system 232, and communications between the robotics management system 232 and the robots 110. Such management may be structured according to model of robotics activity 300.

Data related to the robots 110 may include, for example, a robot definition 305 for each robot 110, a robot capability 310 for each robot 110, a robot schedule 315 for each robot 110, and robot performance metrics 320 for each robot 110.

Operations performed by robotics management system 232 may include, for example, robot resource management 330, robot definition management 350, detailed robot scheduling 325, robot dispatching 345, robot execution management 360, robot tracking 335, robot data collection 355, and robot performance analysis 340. In a system utilizing robots provided by multiple robot vendors, these operations may reflect differences between robots provided by different vendors. For example, each robot vendor may make data pertaining to each robot available in a different format particular to that robot or vendor. To address this, robotics management system 232 may standardize the data by pulling and interpreting a subset of data that may be relevant to a human operator. For instance, two robots from different vendors may each have an error in a mission relating to a blockage, but the robots may format and present that error in different ways depending on their platform. Robotics management system 232 may correctly interpret the differing information presented by robots from multiple vendors via adapters, such as robot-specific adapters 644 discussed below with respect to FIG. 6.

During robot resource management 330, robotics management system 232 may update or refer to robot capability information 310 to maintain information about available robot resources and make those resources available for robot-assigned tasks. For example, during the course of performing missions or tasks, the capabilities of a robot may temporarily change, such as the depletion of the robot's battery, damage or malfunction of one or more tools or sensors attached to the robot, removal or replacement of one or more tools or sensors attached to the robot, or other changes to a robot's capabilities. In addition, a robot may become unable to move from a current location, due to an obstruction, environmental conditions (e.g., heavy rainfall for a robot not protected from wet conditions), damage to a robot's track, leg, or other means of propulsion, a loss of connectivity to robotics management system 232 or other plant systems, etc. In addition, a robot working in extreme heat, such as in a desert environment, may overheat a component of the robot. Similarly, a robot working in extreme cold may affect the operation of a joint or other moving parts. Such temperature extremes may shorten the life of a robot's battery.

Robotics management system 232 may monitor the robot's condition and maintain robot capability information 310 to reflect such changes and make decisions on how to schedule or re-schedule the fleet of robots for the best performance. In some embodiments, an operator or technician may be responsible for updating robot capability information 310 for robotics management system 232. Each robot may also (or alternatively) report capability information, including payload status, to the robotics management system 232 prior to mission execution. If the robotics management system 232 determines that the payload capabilities of a robot are insufficient for a mission, robotics management system 232 may select a different robot for the mission and update the specific robot capabilities.

Robotics management system 232 may check future scheduled missions against updated robot capabilities. If no other capable robot is available at the time a mission is to be run, then a robot payload may be changed, replaced, and/or updated to allow for the mission to run. Such a change, replacement, or update may impact the availability of the robot during a time in which the mission was initially intended or scheduled to be run. The mission may indicate a period of time, or other recurring circumstances in which a mission may be performed. In such a case, the mission may be rescheduled to run at a later time under conditions suitable for the mission. To avoid rescheduling, robotics management system 232 may verify robot status in advance of the start of the mission (the time needed will be dependent on the facility and personnel). This verification may require a pre-check, which may also include checks of camera, microphone, sensor, payload, and/or other capabilities of the robot. This may be done for all robots, including those with mutable and immutable sensors.

During robot definition management 350, robotics management system 232 may maintain robot definition information and may transmit robot-specific production rules 365 to robots 110. For example, in addition to the temporary changes in robot capabilities discussed above, a particular robot may be subject to permanent changes in capabilities and availability, such as the removal or installation of sensors or tools, or the relocation of the robot another area of a facility such that the robot is available to perform missions or tasks in a different limited portion of the facility. Modifications to a robot may change other capabilities of the robot, such as, for example, changes to the total weight of the robot may cause changes to battery life, movement speed, or maximum distance for the robot to travel. Such changes may be reflected in updated robot definition information. During detailed robot scheduling 325, robotics management system 232 may determine and update information about an overall robot schedule. Robot scheduling will be discussed in greater detail below.

During robot dispatching 345, robotics management system 232 may release selected robots 110 to perform robot-assigned tasks. Robot dispatching will be discussed in greater detail below. During robot execution management 360, robotics management system 232 may transmit robot commands 370 to robot 110 and may receive responses 375 from robot 110. Robot activity commands and data collection will be discussed in greater detail below. During robot tracking 335, robotics management system 232 may maintain information about robot location, status, and performance during robot-assigned activities or during idle periods. Robot tracking will be discussed in greater detail below. During robot data collection 355, robotics management system 232 may receive robot-specific data 380 from robot 110. Robot data collection will be discussed in greater detail below.

During robot performance analysis 340, robotics management system 232 may perform analysis of robot performance in the completion of robot-assigned tasks. This analysis may include updates to information for robot definition 305 and robot capability 310 to improve the performance of robot-assigned tasks. For example, the time taken for a robot to complete a mission or task, or a portion of a mission or task, such as traveling from one place to another, traveling stairs or a ramp, may be measured. In addition, the accuracy of measurements and data (e.g., photographs, or other data) gathered by the robot may be monitored to determine if the robot generally returns accurate measurements and data. Such information may be taken into account when planning a mission or task for the robot in the future, or may be used to determine that the robot is in need of maintenance.

In addition, a task assigned to a robot may be modified after scheduling, during execution, or as a result of execution. Circumstances around the mission may change, necessitating such a modification. For example, as a result of opening a door, a change in temperature or air composition may be detected, such that a different sensor is needed to provide accurate and actionable feedback regarding the environment around the mission. As another example, a measured temperature may be lower than expected such that opening a manual valve may require a higher torque than can be applied by the original robot assigned to the task.

Figure 4:
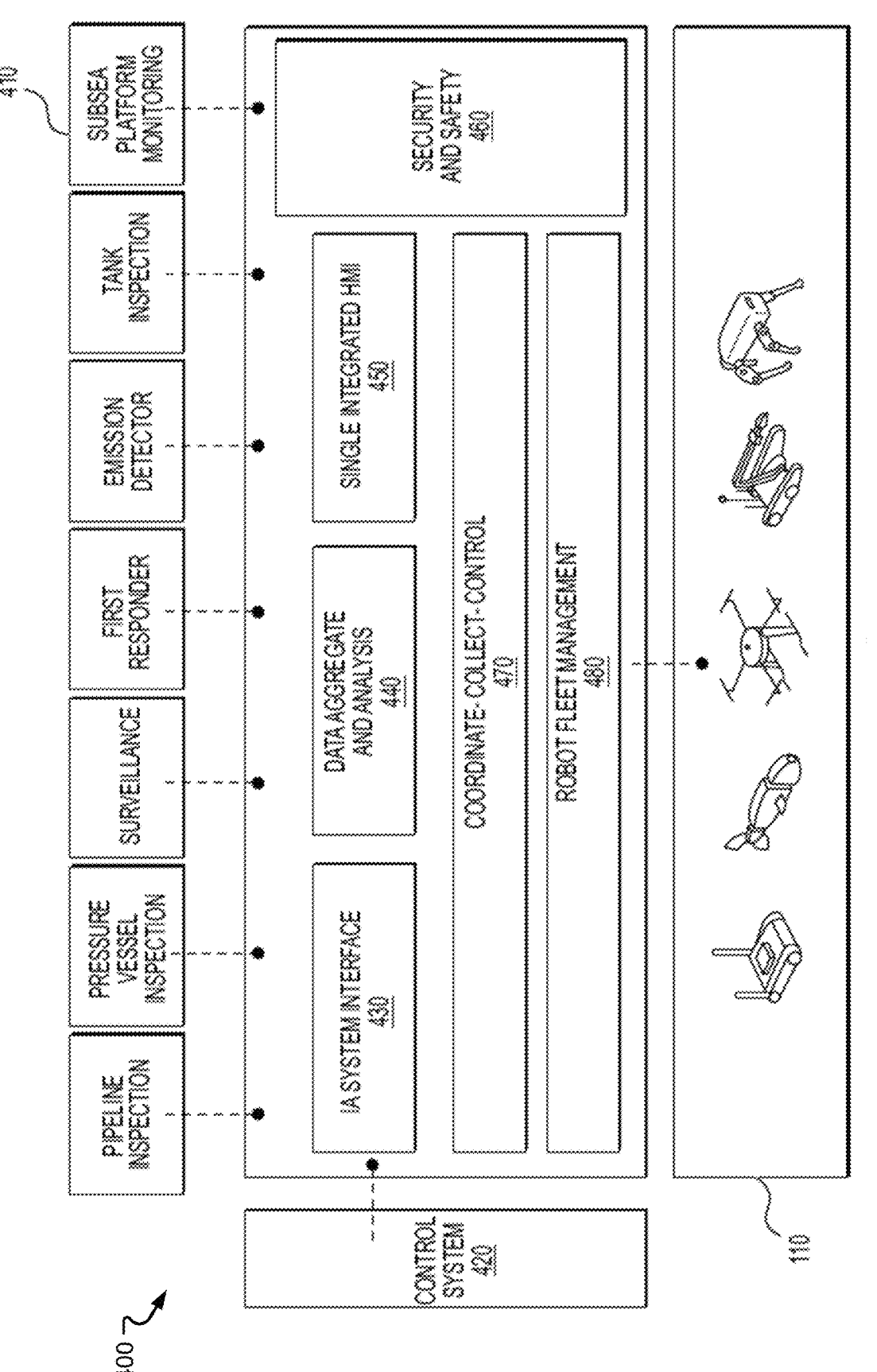
FIG. 4 illustrates an example of components of a robotics services platform within an operations management system, according to one or more example embodiments.

As discussed above, an operations management system may interact with a robotics management system, such as a robotics services platform (RSP) to manage robots 110 and robot-assigned tasks. FIG. 4 depicts components of a robotics services platform (RSP) 400 within, or otherwise in communication with, an operations management system, according to one or more embodiments.

Activities of robots 110 within an operations management system 200 may relate to a variety of industrial operations 410 including, for example, pipeline inspection, pressure vessel inspection, surveillance, first responder, emission detection, tank inspection, and subsea platform monitoring. The identified operations 410 are only exemplary; the principles of this disclosure may pertain to any facility suitable for professional services to be carried out by a robotic fleet in dynamic environments. Such services may be repetitive and/or dangerous for human operators that may have previously placed human operators into such roles in reliance on human ability to recognize and adjust to the dynamic environment.

Such dynamic environments may require the robotics services platform to recognize and adjust the activity of individual robots or the robot fleet to meet changing circumstances, or to operate in environments that may not be designed for robotic operations, while managing a fleet of robots of varying technical and operational capabilities. For example, applicable facilities may include chemical and pharmaceutical manufacturing, mining, food and beverage production, water and wastewater treatment, etc. To support these operations, RSP 400 may receive commands from an external control system 420, such as operations management system 200 or an industrial automation (IA) system, and may, for example, include modules for interfacing with an industrial automation system 430, for data aggregation and analysis 440, for security and safety 460, for coordinating operations, collecting data, and controlling robots 470, and for robot fleet management 480.

Access to these modules may be provided to a human operator by way of an integrated human-machine interface HMI, 450. Industrial automation system interface 430 may provide services for the automation of industrial processes, possibly in conjunction with an external industrial automation (IA) system. Data aggregation and analysis module 440 may receive data from robot-assigned tasks, and may support the aggregation and analysis of the data. Data aggregation and analysis will be discussed in greater detail below. Security and safety module 460 may ensure the safety and security of facility operations and of individual robots 110. Coordinate-collect-control module 470 may provide overall management of robot-assigned activities, coordination or robot-assigned activities, and collection of data returned from robot-assigned activities. Robot fleet management module 480 may provide management of a fleet of robots 110, including, for example, maintaining information about the current status, location, availability, and performance of individual robots 110, coordinating related or potentially conflicting activities of multiple robots 110, and coordinating required maintenance and/or removal of individual robots 110. Additional detail regarding robot management is provided herein.

Figure 5:
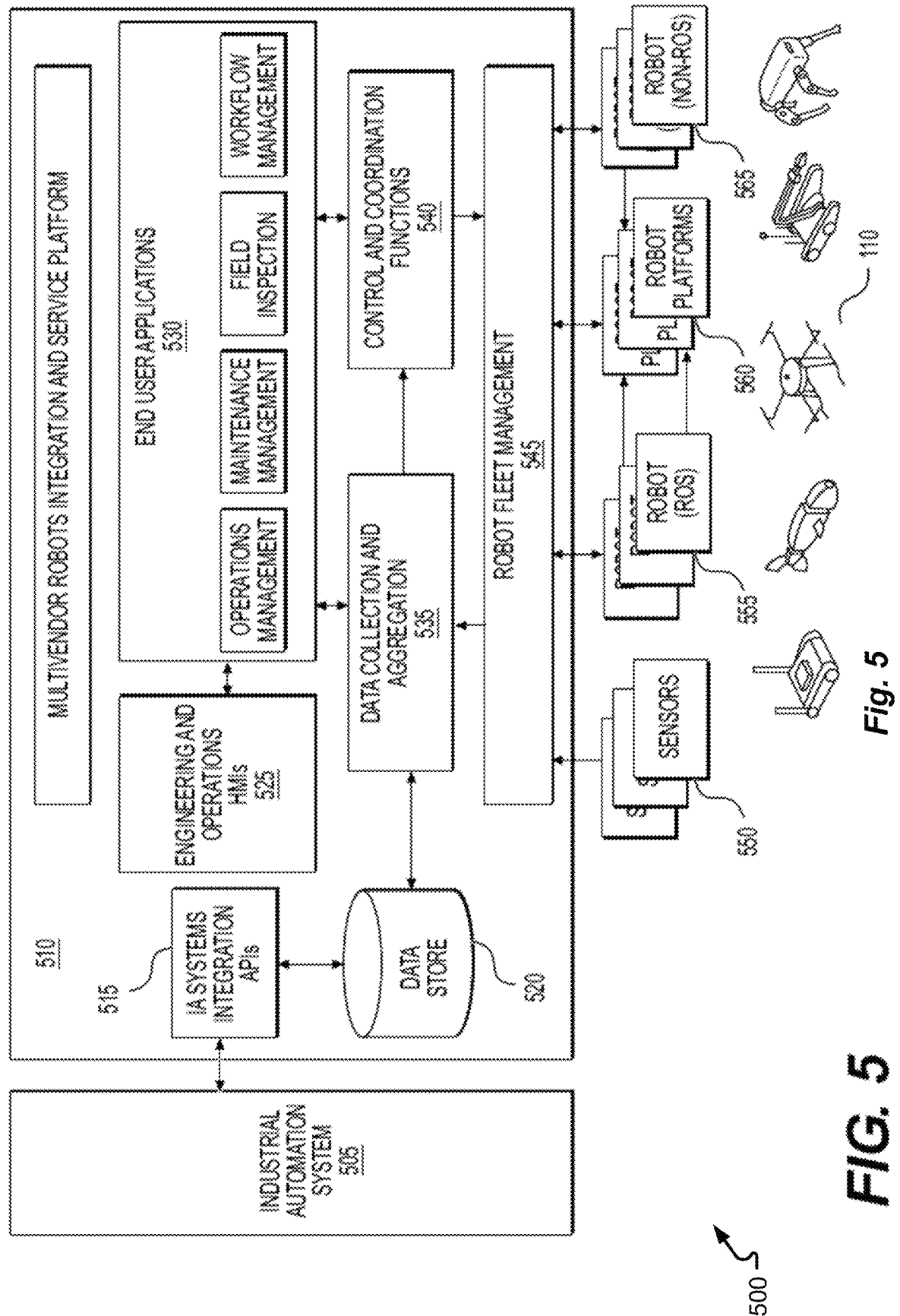
FIG. 5 illustrates an example of a detailed architecture of a multivendor robotic services platform, according to one or more example embodiments.

Managing robot activities in a large or complex industrial facility may require coordination of robots provided by multiple vendors, each having different, and potentially incompatible, command and control or data management and communication protocols. Accordingly, integrating robot fleets into industrial facilities may become increasing complex as the number of robots and robot-assigned tasks increase. FIG. 5 depicts a detailed architecture 500 of a multivendor robotic services platform 510 to address these issues, according to one or more embodiments.

Multivendor robotic services platform 510 may interface with an external control system, such as operations management (OM) system 200 or industrial automation (IA) system 505, by way of IA systems integration application programming interfaces (APIs) 515. Multivendor robotic services platform 510 may provide humans that manage, control, or otherwise oversee the robot fleet, with access to end user applications 530, such as, for example, operations management relating to the overall operation of the facility, maintenance management relating to activities for the maintenance of the facility, field inspection relating to the direct inspection of portions of the physical facility, and workflow management relating to coordinating multiple human and robot activities within the facility, by way of engineering and operations human-machine interfaces (HMIs) 525.

An instruction for an activity from OM 200 may be a work instruction (WI) that may be directed for assignment to a human. Such an instruction may be in a human-readable format. Multivendor robotic services platform 510 may transform the WI to robot commands. If there are multiple types of robots from multiple vendors, translations may be performed differently for each type of robot, as discussed elsewhere in this disclosure. If the activity is performed by a human, WIs may be assigned to operators in the context of shift planning. If the activity is to be assigned to a robot, robotic services platform 510 may autonomously translate and assign the WI to one or more robots, as discussed elsewhere in this disclosure.

In other embodiments, if an alarm generates a robot mission, such as from an external application, then actions may be taken to ensure that a capable robot is available. For example, if the alarm is a critical alarm, robotic services platform 510 may determine to abort a current mission and handle the critical alarm mission if no robot or human is available. Alternatively, the operator may manually take over a robot to tend to the alarm. External systems may send a request for the performance of a task, and the robotic services platform 510 may reply with robot availability or mission starting information. Human and robot tasks may each include capability requirements for a human or robot assigned to the task, such as a requirement of being capable of working at a specified height above the ground, or a capability of using a particular tool. In addition, tasks may have requirements related to the operation status of the facility, such as time of day restrictions, a requirement that the plant not be in operation while the task is performed, or changes in governmental or other regulations governing operation of the facility. Robotic services platform 510 may segregate requests received from OM system 200 or IA system 505 into those that may be robot compatible tasks that may be sent to relevant robots to execute and those that may be robot incompatible tasks that may be returned to OM system 200 or IA system 505 for assignment to a human.

Robot fleet management module 545 may interact with a variety of robot platforms 560 supporting interaction with robots 110, as well as sensors 550 (e.g., environmental sensors). Robot platforms 560 may include platforms for interacting with open source robot operating systems 555, such as Robot Operating System (ROS), as well as vendor-specific (non-open source) robots 565. Robot fleet management module 545 may also interact directly with ROS robots 555 and non-ROS robots 565 rather than via robot platforms 560. The interaction between robot fleet management module 545 and robots 110 may include, for example, robot commands for mission and task completion based on information from control and coordination functions 540. The interaction between robot fleet management module 545 and robots 110 may further include, for example, collection of data and other information from robots 110 and sensors 550, which may be provided to data collection and aggregation module 535 for further processing. Such processing may include storing the collected and processed data in data store 520 and/or providing the collected and processed data to end user applications 530. Data stored in data store 520 may further be provided to (IA) system 505 by way of IA systems integration APIs 515.

Coordination functions 540 may translate end user application functions into robot system functions. For example, if the end user requests an inspection of a gauge, then coordination functions 540 may translate that request into a robot mission to take a picture of the gauge. For example, coordination functions 540 may determine a robot mission including detailed steps such as navigating from the robot's current location to the location of the gauge, taking an image of the gauge, and returning either the image of the gauge or an analysis of the gauge reading based on the image. Other requested tasks would translate to other appropriate operations. To support robots from multiple vendors, the gauge mission may be preconfigured to support multiple robots by the robot fleet management module 545. For example, detailed operations corresponding to robots from multiple vendors may be pre-determined and stores. This may allow robot missions based on recurring task requests to be dispatched quickly or to be scheduled on a recurring basis.

Coordination functions 540 may further coordinate robot tasks with operations being performed by other human and robot operators, such as steps being taken by operators in a control room, automated steps in the IA platform, and field operations. Each of these components work in tight synchronization to ensure proper operation of the facility. In conventional facilities, much of this synchronization may be conducted verbally; in a facility applying a robotic fleet, coordination functions 540 may integrate robots and automated systems into this synchronization. In some circumstances, complete control over a robot at all times may not be possible, and a robot may be allowed to operate semi-autonomously to use any particular capabilities of the robot to complete a task. Where multiple robots are assigned missions, coordination functions 540 may assign some missions with an appropriate time delay to avoid conflicts among robots operating in the same area.

In a facility with robots from multiple vendors, robot fleet management, such as may be provided by robot fleet management module 545, robot activity control, such as may be provided by control and coordination functions 540, and data analysis, such as may be provided by data collection and aggregation module 535, may utilize additional vendor-specific and robot-type-specific capabilities in a multivendor robotic services platform (RSP).

Figure 6:
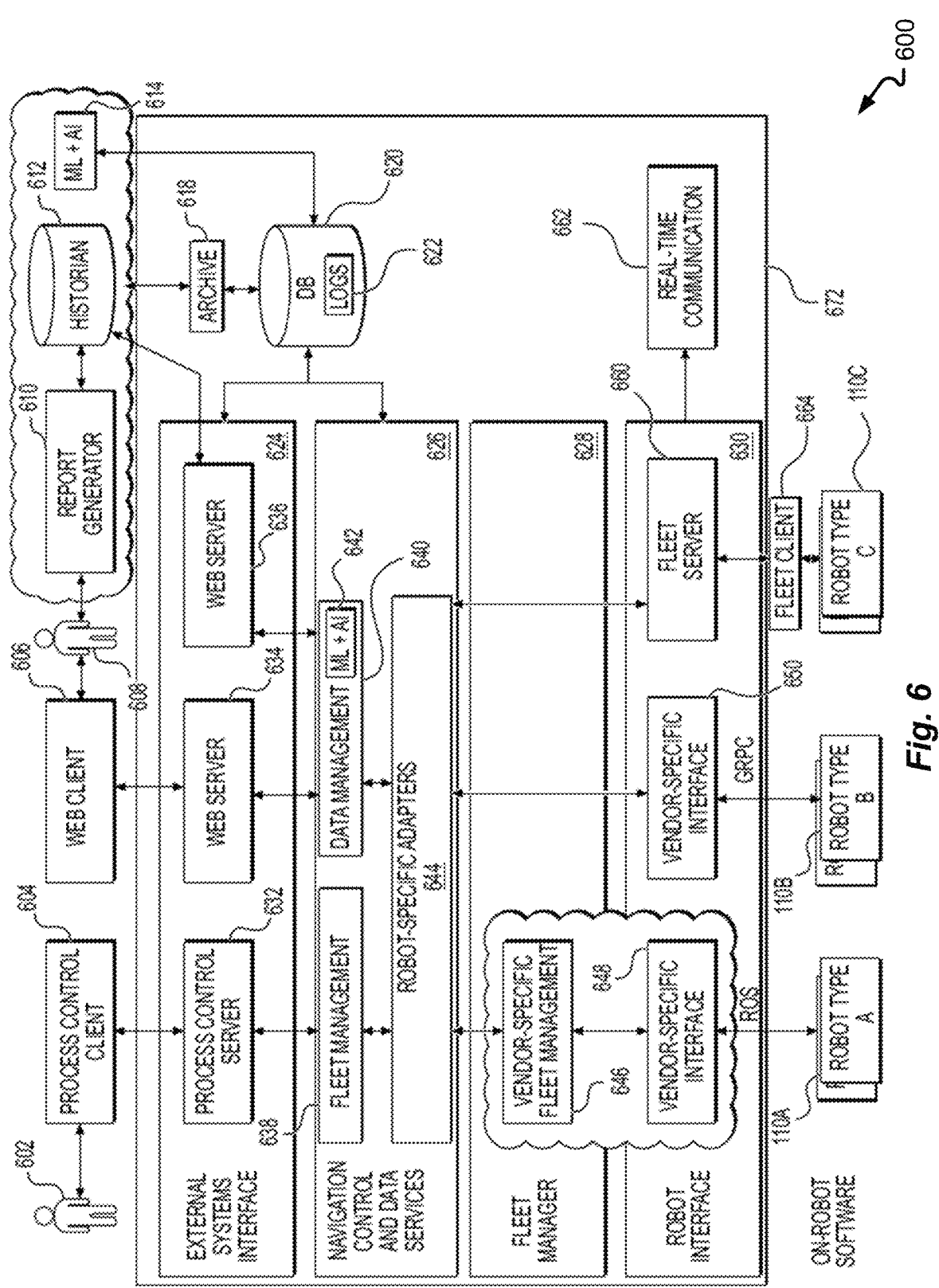
FIG. 6 illustrates another example of a detailed architecture of a multivendor robotic services platform and associated components, according to one or more example embodiments.

FIG. 6 further depicts a detailed architecture 600 of a multivendor robotic services platform (RSP), according to one or more embodiments.

Robot services platform 672 may include, for example, external systems interface 624, navigation control and data services 626, fleet manager 628, and robot interface 630, etc.

External systems interface 624 may include, for example, process control server 632, which may receive information for processes and tasks to be completed from a process control client 604 under the direction of a human operations manager or operator 602. For example, the received missions and tasks may include activities to be performed by humans or robots relating to the overall operation of the facility, such as facility inspections, data collection, facility control (e.g., changing control settings), etc. External systems interface 624 may further include, for example, a first web server 634, which may provide data reports to a web client 606 for display to a human operator or analyst 608. External systems interface 624 may further include, for example, a second web server 636, which may provide data feeds to a historian data store 612.

Historian data store 612 may provide data to a report generator 610, which may provide additional reports to human operator or analyst 608. Historian data store 612 may further provide data to an archive module 618 for storage in a database 620 within the robot services platform 672. Database 620 may provide data to a machine learning (ML) and artificial intelligence (AI) module 614 for further analysis. Analysis results from ML and AI module 614 may be stored in database 620. Database 620 may further provide data to historian data store 612 for access by report generator 610. Report generator 610, historian data store 612, and ML and AI module 614 may be cloud-based, or may otherwise operate separately from robot services platform 672.

Navigation control and data services 626 may include, for example, robot-specific adapters 644, which may provide platform-independent command, control, and data services for robots 110A, 110B, and 110C. Robot-specific adapters 644 may include adapters for communication of data collected by robots 110, such as, for example, photos, video, environmental data, sensor readings, etc., adapters for communication of data about robots 110, such as, for example, robot motion and location, robot health and status, robot capabilities, etc., and adapters for communication of command and control information to and from robots 110, such as, for example, multi-step mission instructions, individual operation instructions (e.g., navigate to a destination, take a photograph, take a video recording, take a sound recording, take an environmental measurement, take a temperature measurement of a substance, take a temperature measurement of the air, take a humidity measurement, determine an instrument reading, measure a presence or concentration of a gas or chemical, emit light of a particular wavelength, intensity, and/or emission pattern, emit sound of a particular pitch, intensity, and/or emission pattern, emit a radio frequency homing beacon, transmit stored data via a radio frequency or wireless data network, connect to a power source, connect to a radio frequency or wireless data network, connect to a data network port, modify a setting of a valve or other control, such as by adjusting the position of a valve, vane, locally controlled pump, or drive, take a manual product sample, press a button, change a switch position, move an object, stop all operations, return to home, activate a particular sensor, etc.), etc. Robot-specific adapters 644 may also receive information from robots 110 including, for example, information about task or mission status and completion, non-data task completion information (e.g., mission complete or abandoned, etc.).

Command/control and data information may be maintained generally within RSP 672 in one or more common internal formats. This may allow the internal operations of RSP 672, and the interfaces and information shared outside of RSP 672, such as with other components of an operations management system (OM), to be independent of which robots or robot types are active in the facility. Thus, the complexity of utilizing a diverse fleet of robots within a facility may be reduced. To this end, each adapter may take in information from RSP 672 in one or more of the common internal formats, transform that information into a specific information suitable for the particular robot (e.g., in a format compatible with the particular robot) to which it will be communicated, and then transmit the transformed information to the particular robot.

For example, a definition of a robot task or mission may be transformed from a common internal format to a format that conforms to the expected command protocols for the assigned robot. Conversely, data transmitted from a robot may be received by an adapter in a robot-specific format and be transformed by an adapter into a common internal format for use by RSP 672 and other components of an operations management system (OM), such as operations management system (OM) 700 described in FIG. 7. A common internal format for a definition of a robot task or mission may include a list of measurements or data to be captured within a facility. Adapters 644 may transform this list into robot-specific instructions that may include, for example, directions to physically travel to the data-capture locations and which instruments to use. Vendor specific robot data may also be parsed by the adapters 644 to detect generalized or useful information to display to an operator. For example, data such as battery life may be displayed in different ways (percentage/voltage remaining/time remaining) that may be parsed and standardized.

Some such adapters 644 may be narrowly adapted to communicate with particular robots according to robot type or vendor, while others may be compatible with multiple robot types. Adapters 644 may be considered fleet-specific adapters compatible with multiple robots of a same type and make operating concurrently or in cooperation. Adapters 644 may be manually coded based on the common internal data formats and information about data and command protocols for specific vendors and robots. Alternatively, such adapters may be automatically generated based on algorithmic or artificial intelligence processes. Adapters may be configured to provide equivalent levels of basic control across multiple robot types. This may include, for example, the capability of movement to specific points, data captures, and robot metric reporting. Adapters may further include added functionality depending on the robot vendor specific software limitations on each robot type. For example, if a robot is unable to log its metric data, the adapter may log the robot's metric data to maintain compatibility with a standard adapter level for other components of the platform.

Common features from different robot types may be abstracted into a common internal data format, such as map data, simulation data on 3D models, etc. OM system 700 or IA system 505 may assign a work instruction (WI) checklist, which may be in a human readable format, such as a spreadsheet, etc., consisting of instructions to record information corresponding to various identifiers. RSP 672 may convert a WI checklist into detailed information, such as absolute or relative position and orientation information such as GPS coordinates, site specific visual, electronic or magnetic identifiers etc., for execution by robots. Unstructured data types recorded by robots, for example media formats such as image, sound, or video, etc., may be further processed by RSP 672 using data processing applications into structured data types, such as text or numeric data compatible for storage and processing in OM system 700 or IA system 505.

Navigation control and data services 626 may further include, for example, fleet management module 638 to receive information for missions and tasks to be completed from process control server 632. Fleet management module 638 may determine which of robots 110A, 110B, and 110C should perform each task or mission, and may provide detailed information about robot tasks and missions to robot-specific adapters 644. Fleet management module 638 may also provide information about the progress or completion of missions and tasks to process control server 632. Navigation control and data services 626 may further include, for example, data management module 640, which may receive data from robots 110A, 110B, and 110C by way of robot-specific adapters 644. Data management module 640 may further include a machine learning (ML) and artificial intelligence (AI) module 642, which may further analyze data received from robots 110A, 110B, and 110C.

External systems interface 624 and navigation control and data services 626 may provide information about tasks dispatched to and performed by robots 110A, 110B, and 110C, task results returned by robots 110A, 110B, and 110C, and other information related to the management of robots 110A, 110B, and 110C, and missions performed by robots 110A, 110B, and 110C, to database 620. For example, a record of robot tasks and task results may be stored in logs 622 within database 620.

Fleet manager 628 may manage a fleet of robots 110A, 110B, and 110C with respect to, among other things, scheduling and dispatching missions and tasks to robots 110A, 110B, and 110C, monitoring the health and maintenance status of robots 110A, 110B, and 110C and their components, and scheduling maintenance of robots 110A, 110B, and 110C. Fleet manager 628 may include vendor specific fleet management module 646, which may provide management of robots 110A, 110B, and 110C that is specific to the vendor of one or more of robots 110A, 110B, and 110C. A separate vendor specific fleet management module 646 may be provided for each vendor-specific interface, such as vendor-specific interfaces 648 and 650.

Fleet manager 628 may assign missions and tasks to robots 110 based on mission requirements and robot capabilities. For instance, if fleet manager 628 determines that a mission can be supported by only a robot type of type A, fleet manager 628 may assign the mission to only a robot among robots 110A, 110B, and 110C of type A. For example, a mission may require traversing obstacles, such as stairs, that can only be traversed by robots of a particular type. For another mission that can be assigned to a robot of type A or B, fleet manager 628 may assign the mission to a robot among robots 110A, 110B, and 110C of type A or B based on the availability of each robot 110A, 110B, and 110C. The availability of each robot 110A, 110B, and 110C may be determined by fleet manager 628 using metrics such as, for example, communications state and battery life, etc.

In some embodiments, operations management system 200 may specify a mission or task to be performed by a specific robot or a robot among a specific group of robots. If a group of robots is specified, then fleet manager 628 may assign the mission to a selected robot among the specified group of robots. In addition, some attributes of a robot type or robots from a particular vendor may have a known reliability and fleet manager 628 may apply more or less direct monitoring of a robot based on this known reliability.

Robot interface 630 may include, for example, a first vendor-specific robot interface 648, a second vendor-specific robot interface 650, and a fleet server 660. Each of first vendor-specific robot interface 648 and second vendor-specific robot interface 650 may provide an interface to a robot that is specific to the vendor of that robot. For example, first vendor-specific robot interface 648 may interact with robot 110A by way of a robot operating system (ROS) interface, while second vendor-specific robot interface 650 may interact with robot 110B by way of a proprietary remote procedure call (RPC) interface. The number and types of vendor-specific robot interfaces provided by robot interface 630 is not limited, and may depend on the number and type of robots in the fleet of robots managed by robot services platform 672.

Vendor specific interfaces are conventionally required to access these robots. That is, robots from each vendor typically have proprietary software and are gated using each vendor's application programming interfaces (APIs). For example, if a vendor uses gRPC calls to access their unique API to control a robot from that vendor, there may be no other alternative to communicate with or control the robot. Fleet server 660 may interact with a coordinated fleet of robots, such as robots 110C by way of fleet client 664. Robot interface 630 may further interact with real-time communication module 662 to provide additional communication streams to, for example, robots 110A, 110B, and 110C, human operations manager or operator 602, such as through process control server 632 or process control client 604, or other components of RSP 672.

For real-time communication, robot interface 630 may support multiple types of protocols for streaming data. For example, WebRTC is a streaming protocol for high quality video/sound streaming that may be utilized for such communications. Such streaming may include, for example, receiving data to be displayed to an operator as well as performing real-time processing of the data using artificial intelligence (AI) or machine learning (ML) to support functions such as, for example, anomaly detection. Real time communication can be important for fleet management in order to execute different tasks. Some robots may have a capability to work during lost communication for a short period of time, while others may not. Fleet server 660 may need to frequently communicate with each robot based on the robot's capability and keep track of a robot during a mission.

Vendor-specific fleet manager module 646 and fleet server 660 may be cloud-based, or may otherwise operate separately from fleet manager 628 and robot interface 630.

Robots 110A, 110B, and 110C may be provided by different vendors and may be of multiple types, and may further have distinct instrumentation, tools, and sensors available. Each robot may maintain, possibly in conjunction with robot management and fleet management modules of RSP 672, information about the health and status of the robot 110, including battery or fuel levels, capabilities, locations, malfunctions, and maintenance requirements, etc.

Examples of robots 110A, 110B, and 110C may include robots that are fully autonomous, pre-programmed for specific tasks, motions, routes, or activities, or under direct human control. Robots 110A, 110B, and 110C may be stationary or mobile, and mobile robots may include wheeled, tracked, bi-ped, quadraped, or multi-ped, or other means of propulsion. Robots 110A, 110B, and 110C may be provided with tools, sensors, or other hardware for the completion of missions and tasks, such as articulated arms, grips, claws, wrenches, drivers, hammers, pry bars, cameras, microphones, chemical detectors, noise sensors, vibration sensors, etc. Robots 110A, 110B, and 110C may include digital and physical storage, such as for photographs, video, sound, environmental readings, environmental samples, such as soil, chemicals, etc. Robots 110A, 110B, and 110C may include various communications capabilities, including analog (radio and video transmission, etc.) and digital (Wi-Fi, Bluetooth, other near-field communication, etc.).

A robotic services platform, such as RSP 672, may interact with and depend upon other subsystems of an operations management system. FIG. 7 depicts subsystems of an operations management system 700 as well as a multivendor RSP, which may operate as part of or separate from, or otherwise in cooperation with, operations management system 700, according to one or more embodiments.

Operations management system 700 may include multiple subsystems to support the operation and management of an industrial facility. Such subsystems may include, for example, an operation support system 702, a patrol management system 704, a task management system 706, a process control system 710, and a robot management system or robot support platform (RSP) 672.

Process control system 710 may provide operations control and monitoring for a facility through control subsystems that may be distributed throughout the facility or located outside the facility. Process control system 710 may include, for example, a collaborative information server 722, which may support sharing information between process control system 710 and other subsystems of operations management system 700. Process control system 710 may also include a field control system 728, which may control processes within the facility and collect data from those processes data via field instruments, and a safety control system 730, which may monitor safety conditions of processes within the facility and may ensure that processes return to a safe state if deviations occur. Process control system 710 may coordinate with operation support system 702, patrol management system 704, task management system 706, a and robot management system or robot support platform (RSP) 672.

Operation support system 702 may provide services to support the overall operation of the facility. Operation support system 702 may include, for example, a collaborative information server 722, which may support sharing information between operation support system 702 and other subsystems of operations management system 700, a procedure information management module 714, which may store and manage information about procedures and processes for operating the industrial facility, and a procedure execution management module 716, which may manage execution of the procedures and processes.

Patrol management system 704 may provide services related to periodic patrol and monitoring of the facility with respect to operations, safety, and security. Patrol management system 704 may include, for example, a collaborative information server 722, which may support sharing information between patrol management system 704 and other subsystems of operations management system 700. Patrol management system 704 also may include a checklist management module 718, which may manage checklists to ensure that all operations, safety, and security protocols are sufficiently covered, a checklist execution management module 724, which may manage the execution of tasks to fulfill checklist requirements, such as may be determined by checklist management module 718, and a schedule management module 720, which may schedule the completion of checklist tasks. Checklists and associated checklist tasks may be assigned to either human or robot assets. Assignment and scheduling of robot-assigned tasks will be discussed in greater detail below.

Task management system 706 may provide the creation, assignment, and monitoring of tasks within a facility. Tasks may be human-assigned or robot-assigned. Task management system 706 may include, for example, a collaborative information server 722, which may support sharing information between operation task management system 706 and other subsystems of operations management system 700. Task management system 706 may also include a trigger management module 725, which may generate new tasks triggered by incoming information, and a task execution management module 726, which may control the assignment and execution of tasks. Management of robot-assigned tasks will be discussed in greater detail below.

RSP 672 may provide management and operation of a fleet of robots of varying types provided by multiple vendors. RSP 672 may include, for example, a collaborative information server 722, which may support sharing information between RSP 672 and other subsystems of operations management system 700. RSP 672 may also include robot fleet management module 628, robot data management module 640, robot common interface module such as robot-specific adapters 644, database 620, a robot data analysis module such as data management module 640 and machine learning (ML) and artificial intelligence (AI) module 642, all of which are discussed above with respect to FIG. 6. RSP 672 may further include, for example, robot interface modules specific to different types of robots, such as robot A interface 742 interacting with robot 110A of type A, robot B interface 744 interacting with robot 110B of type B, and robot C interface 746 interacting with robot 110C of type C.

Robot interfaces may connect directly with robots 110, such as is shown for robot B interface 744 and robot C interface 746, or may connect to a robot 110 through an external robot controller, such as robot control 748 connecting robot A interface 742 with robot 110A. Such external robot controllers may be cloud-based servers, as shown in FIG. 7, or may be connected by various types of computer networks. Exemplary connections between a robot support platform and robots 110 will be discussed below with respect to FIG. 8.

Figure 8:
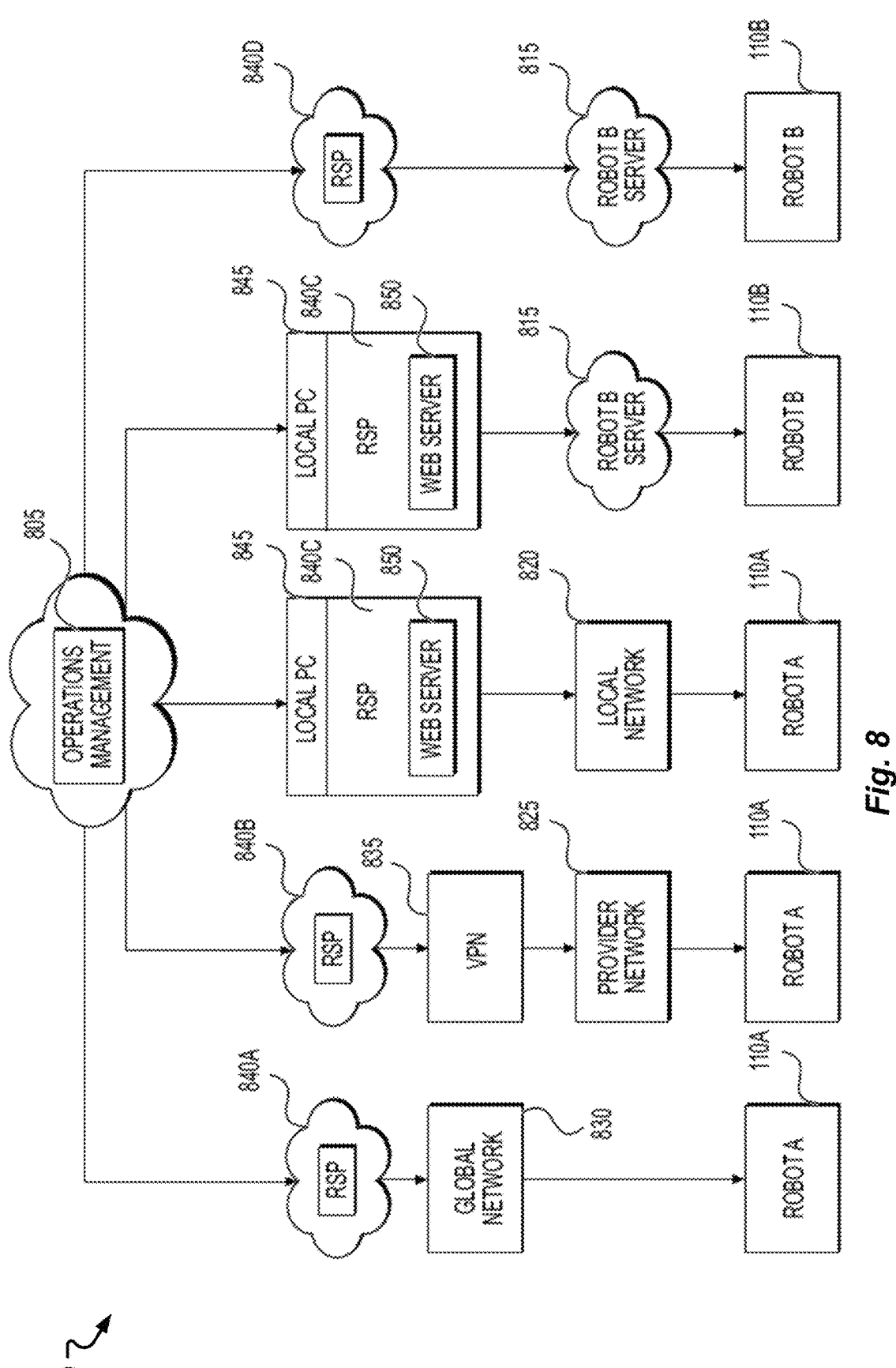
FIG. 8 illustrates an example of an environment for robot control and communication within a multivendor robotic services platform, according to one or more example embodiments.

FIG. 8 depicts an environment 800 for robot control and communication within a multivendor robotic services platform, according to one or more embodiments.

Operations management system 805 may include many systems and modules for the overall management of an industrial facility, such as, for example, those systems and modules depicted in FIG. 2 and discussed above. As discussed above, operations management system 805 may interact with a robot support platform (RSP) 840 to provide information for missions and tasks related to the operation of the plant that may be performed by robots, such as robots 110A and 110B.

Connection between operations management system 805, RSP 840, and robots 110 may be provided differently depending on the needs and capabilities of the facility and robots 110. For example, in one embodiment, RSP 840A may be provided as a cloud-based service which utilizes a global network 830, such as the Internet, to connect to robot 110A. In another embodiment, a cloud-based RSP 840B may use a virtual private network 835 to securely connect to an internet service provider network 825, and from there connect to robot 110A. In yet another embodiment, RSP 840C may be provided as an application running on a local computer, such as local personal computer 845. RSP 840C may utilize a local webserver 845 and a local network 820 to connect to robot 110A. In yet another embodiment, RSP 840C may utilize webserver 850 to connect to a vendor-specific robot server 815 and from there to robot 110B. Vendor-specific robot server 815 is depicted as a cloud-based service, but vendor-specific robot server 815 could be provided, for example, on local personal computer 845, on a different local computer, or on a remote computer accessible via a global network, such as the internet, etc. In another embodiment, cloud-based RSP 840D may connect to a vendor-specific robot server 815 and from there to robot 110B.

Figure 9:
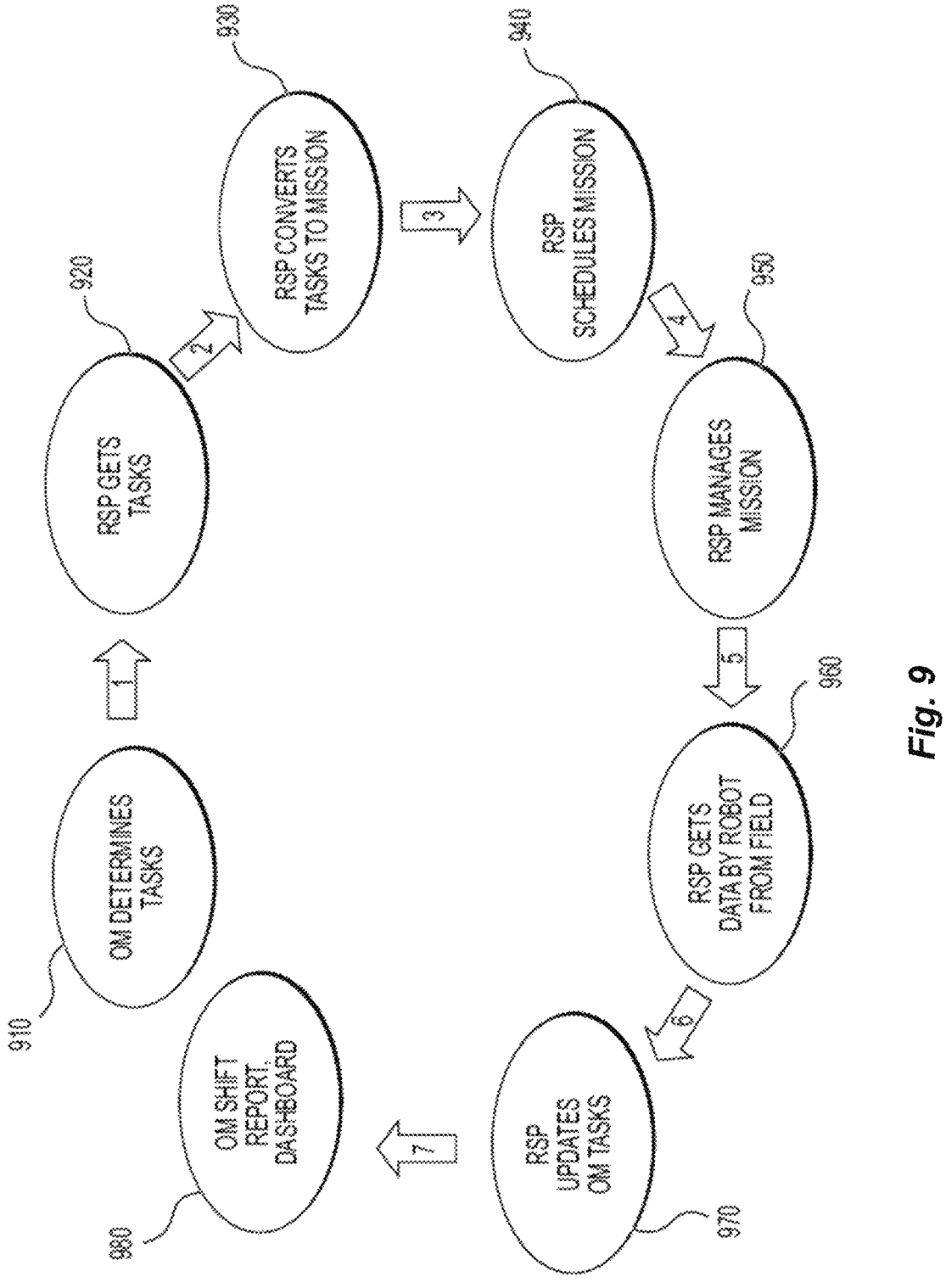
FIG. 9 illustrates an example of a process of planning, assigning, and executing robotic tasks within a multivendor robotic services platform, according to one or more example embodiments.

FIG. 9 depicts a process 900 of assigning, scheduling, and executing robotic tasks within a multivendor robotic services platform (RSP) (e.g., RSP 672 in FIG. 6), according to one or more embodiments. In operation 910, an operations management system (OM) (e.g., OM 700 in FIG. 7) may determine that one or more tasks for the operation or maintenance of an industrial facility are desired to be undertaken (e.g., based on a user input, based on a decision by the operations management system, based on a decision by the RSP, etc.). At least one of the tasks may be designated for completion by a robot, in operation 910 or later in the process by an RSP. In operation 920, the OM may transmit the robot-designated tasks to an RSP. In operation 930, the RSP may convert the received robot-designated tasks into one or more robot missions.

Converting a received robot-designated task into a robot mission may include determining factors of the mission, data related to an environment in which the task is located, and/or mission capabilities for accomplishing the task, as described herein. Defining a robot mission will be discussed in greater detail below. In operation 940, the RSP may schedule the one or more robot missions to include, for example, selecting a suitable robot (e.g., a robot capable of performing one or more tasks or functions associated with completing the one or more robot missions), or robots, and assigning the mission to the selected robot(s). Selection and assignment of robots to particular tasks will be discussed in greater detail below. In operation 950, the RSP may manage (e.g., initiate, monitor, and otherwise manage) the one or more robot missions. Managing a robot mission may include, for example, dispatching the robot, monitoring the robot's progress during the mission, and responding to events during the mission, such as by assigning additional or replacement robots to the mission.

Managing a robot mission will be discussed in greater detail below. In operation 960, the RSP may receive data generated by the one or more robot missions. Processing data resulting from robot missions and/or other feedback received from the facility before, during, or after a mission will be discussed in greater detail below. In operation 970, the RSP may update the tasks received from the OM based on the received data. In operation 980, the OM may update various information about the operation of the facility and the completed tasks. This information may include plant operating and maintenance status, and may displayed through various user interfaces, such as, for example, a shift report or a facility status dashboard. The OM may also use the completion status of the tasks and the data generated by the tasks to plan future tasks and/or missions in a new iteration beginning with operation 910.

Figure 10:
FIG. 10 illustrates an example of a dashboard for entering and displaying data, according to one or more example embodiments.

FIG. 10 illustrates an example of a dashboard 1000 that supports aspects of the present disclosure.

In some examples, a user may define, assign, and/or manage tasks via inputs directly to a wired or wireless device via the dashboard 1000. A user may select or modify a mission, a robot, and/or a mission schedule via a GUI, such as the dashboard 1000. Dashboard 1000 or similar device may allow a user to input commands remotely, e.g., via a web client 606 in FIG. 6, or directly, e.g., via process control client 604. Dashboard 1000 may display various headings, such as robot 1010, sensor 1020, mission 1030, and/or alarm/event 1040. These headings may indicate subcategories that may be selected via a touch, a mouse, or the like for receiving, transmitting, and/or viewing information related to a mission and/or to other events within a facility. The categories and/or subcategories may include an image, a number, and/or a word indicating each category or subcategory. For example, the user may select the subcategory configure robot type 1012, selection of which may bring the user to another screen that lists all available robot types. The user may select the type of robot to be used for a specific mission, or the robot may be selected automatically based on a mission profile, as described herein. Alternatively, or additionally, configure robot type 1012 may allow a user to select a human personnel for performing the mission.

Configure robot 1014 may also be shown under category 1010. Selection of configure robot 1014 may allow a user to select various functionalities or capabilities of the robot, such as including a certain sensor package. Configure robot 1014 may also allow the user to select a package, e.g., certain tools and/or sensors, for a human personnel to use during a mission. It will be understood that the functionalities or capabilities may be automatically selected based on, e.g., a mission profile described herein.

A third category, robot status 1016, may be shown under category 1010. Robot status 1016 may show the status of the robot, e.g., via a list (not illustrated). For example, a first robot and a second robot may be shown in a list format on the dashboard 1000 when robot status 1016 is selected. Robot status 1016 may show various robot capabilities or other information relating to each robot, such as robot name, robot type, robot status, communication (comm) status, battery level and battery status, odometer reading, mission status, mission progress, most recent (or last) communication update with the robot, and/or whether the robot has a video capability. It will be understood that this list is only an example, and any robot capability or other information relating to a robot may be supported. It will also be understood that robot status is not limited to robots, and may be used to show the capability or status of any operator, e.g., a robot or a human personnel. In some aspects, robot status 1016 may indicate a current mission(s) and/or a previously recorded mission(s) associated with the robot, a current work task(s) and/or previous work task(s) associated with the robot, and the like.

With continued reference to FIG. 10, four subcategories may be displayed under the sensor 1020 category. For example, subcategories configure area 1022, configure sensor 1024, sensor status 1026, and graphic view 1028 may be displayed. Selecting each of these subcategories may change the display to show various information. For example, selecting configure area 1022 may configure the sensor based on the location in which the sensor is located, e.g., zeroing a sensor for use in a particular area. This may be done manually, or automatically based on feedback.

Similarly, selecting configure sensor 1024 may configure the sensor. For example, the sensor may be an imaging sensor, and capabilities of the image sensor, such as brightness, saturation, or the like, may be altered automatically, or manually by a user, when configured sensor 1026 is selected. Selecting sensor status 1026 may provide a status of the sensor, similar to viewing the status of a robot when robot status 1016 is selected. For example, a list of one or more sensors may be shown, and the status or capabilities of those sensors may be displayed when sensor status 1026 is selected. Selecting graphic view 1028 may display the sensors as graphics, e.g., a temperature sensor as a thermometer, a pressure sensor as a pressure gauge, or the like. Selecting graphic view 1028 may also display other information of one or more sensors in graphical form.

Under the category titled mission 1030, a user may select any one of configure mission template 1032, configure mission 1033, configure mission list 1034, run mission 1036, mission history 1038, or mission history (confirmation) 1039. Selecting configure mission template 1032 may allow a user to change the factors, data, and/or mission capabilities that will be associated with a mission, or may change how the factors are displayed. For example, it may be important for environmental temperature to be considered when defining a mission. In this case, the user may select configure mission template 1032 and may modify the mission template to include temperature as a factor when defining a mission.

In response to a user input selecting configure mission 1033, the robot system platform may display a user interface 1100 (later illustrated at FIG. 11) via which the user may indicate one or more tasks desired by the user. In an example, the tasks may include tasks that the user wishes to be performed with respect to a facility or environment (e.g., an industrial facility 113 or an industrial facility setting 100 of FIG. 1). The tasks may be robot-agnostic tasks as described herein. In some aspects, the tasks may be process automation inspection tasks associated with the facility or environment. Based on the tasks, the robot system platform may provide (e.g., via the user interface 1100) one or more candidate missions to the user in association with completing the tasks. Example aspects of the user interface 1100 and configuring missions are later described with reference to FIG. 11.

Selecting configure mission list 1034 may allow a user to manually modify a scheduled mission or missions. For example, a list of missions and the robot to which each mission is assigned may be displayed when configure mission list 1034 is selected. The user may view the robots and the missions, and may alter the mission schedule. For example, a mission may include acquiring the reading of a sensor, and the user may have knowledge that the sensor is located at a certain height. The user may see the mission scheduled to a robot that does not have the ability to reach the height of the sensor to acquire the sensor data. As will be described herein, this data may be saved for future use, and the mission profile may be automatically updated when data is acquired from this sensor in the future.

Selecting run mission 1036 may cause the mission to begin, or may cause the mission to be scheduled, e.g., to begin at a specific date and time in the future. In addition, if the mission is scheduled in the future, the mission may be manually or automatically selected to begin early via run mission 1036 based on feedback. Selecting mission history 1038 may allow a user to display which missions have been initiated, what data has been acquired, and any alerts or other feedback from the missions. Selecting mission history (confirmation) 1039 may allow data to be manually or automatically confirmed. For example, in the event an image of an analog sensor is acquired, it may be necessary to confirm the reading of the sensor.

The use of dashboard 1000 may allow a user to define, assign, and/or manage missions in any manner described herein. It will be understood that some or all aspects of the defining, assigning, and/or managing of missions may be done manually or automatically. Dashboard 1000 may also enable a user to confirm or correct any data received by the system. Alternatively, dashboard 1000 may be used only to view the status of all missions by a supervisor.

Figure 11:
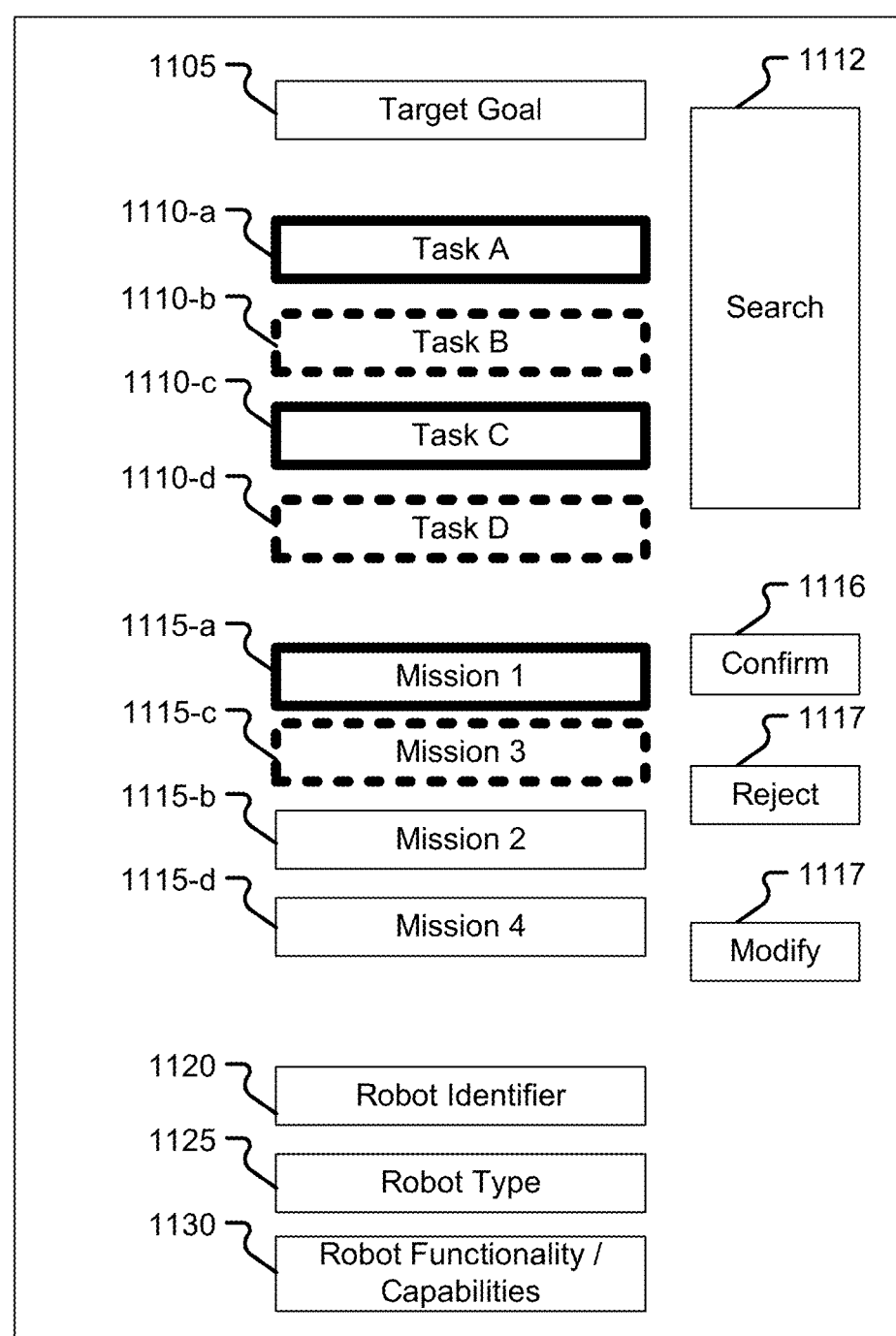
FIG. 11 illustrates an example of a robot-agnostic GUI for entering and displaying data, according to one or more example embodiments.

FIG. 11 illustrates an example of a user interface 1100 via which the user may indicate one or more target tasks associated with a facility and/or an environment. Via the user interface 1100, the robot system platform may provide one or more candidate missions to the user in association with completing the tasks.

Aspects of the user interface 1000 may support viewing, configuring, and building a mission. In an example, via the user interface 1000, a user may provide an input including an indication of a target goal 1105 and/or one or more target tasks 1110 (e.g., target task 1110-*a* through target task 1110-*d*).

In some aspects, the robot system platform may identify and/or configure one or more of the target tasks 1110 based on the target goal 1105. For example, the user may provide an input indicating the target goal 1105, and the robot system platform may set one or more of the tasks 1110 in association with achieving the target goal 1105. Additionally, or alternatively, the user may provide an input indicating one or more target tasks 1110, with or without indicating the target goal 1105.

Any of the target goal 1105 or target tasks 1110 may be robot-agnostic. That is, for example, the target goal 1105 and/or target tasks 1110 may be expressed in a human-readable format rather than a format (e.g., programming language, program code, etc.) that conforms to vendor-specific command protocols for controlling a robot device. In some aspects, the term "robot-agnostic" may refer to a definition of a target goal 1105, a target task 1110 (target robot task), or mission in an internal format common to a robot system platform described herein or an internal format common to an operations management system described herein. In some cases, the term "robot-agnostic" may refer to a definition of a target goal 1105, a target task 1110, or mission that is absent an indication of robot type and/or robot function.

In some aspects, the target goal 1105 and/or target tasks 1110 may include an indication of any target criteria (e.g., before a certain time, during a target time window, urgency, etc.). Based on the target goal 1105 and/or target tasks 1110, the robot system platform may provide candidate missions 1115, aspects of which are described herein. In an example, the candidate missions 1115 may include performing tasks that match the target task(s) 1110. In some cases, the robot system platform may order and display the missions 1115 based on respective rankings (e.g., 'Mission 1' may have the highest ranking and be displayed at the top of the missions 1115, 'Mission 4' may have the lowest ranking and be displayed at the bottom of the missions 1115). In some cases, the robot system platform may display respective ranking information associated with the candidate missions 1115, for example, using any combination of indicators (e.g., using highlighting, shading, color, text, icons, etc.).

In some aspects, in response to a user input selecting a mission 1115, the robot system platform may indicate (e.g., using highlighting, shading, color, text, icons, etc.) which of the tasks 1110 would be performed based on the selection. Additionally, or alternatively, the robot system platform may automatically indicate the correspondence between a task(s)

1110 and the mission(s) 1115. In a non-limiting example, referring to user interface 1100, mission 1115-*a* ('Mission 1') corresponds to task 1110-*a* ('Task A') and task 1110-*c* ('Task C'), and mission 1115-*c* ('Mission 3') corresponds to task 1110-*b* ('Task B') and task 1110-*d* ('Task D'). It is to be understood that, in some example implementations, any quantity of tasks 1110 and/or missions 1115 may be displayed on the user interface 1100.

In some aspects, for a target task 1110 and/or a mission 1115, the robot system platform may indicate a robot identifier 1120, a robot type 1125, and robot functionality/capabilities 1130, aspects of which are described herein. In an example, robot type 1125 may include an indication of mobility type (e.g., fly, crawl, walk, etc.) and/or payload type (e.g., headlight, arm, camera, other sensors, etc.). In some cases, robot functionality/capabilities 1130 may include an indication of the payload type. In some other aspects, any of the robot identifier 1120, robot type 1125, and robot functionality/capabilities 1130 may be omitted (e.g., hidden from view).

Examples of a task 1110 may be "capture image of a measurement equipment gauge," "measure readings at equipment A," and "measure readings for all equipment in the facility." In another example, a target goal 1105 may be "determine efficiency of all equipment in the facility by 5:00 pm," and the robot system platform may automatically suggest tasks A through D (e.g., "capture image of equipment gauge A," "capture image of equipment gauge B," "capture image of equipment gauge C," "capture image of equipment gauge D").

Examples of a mission 115 may include, for example, performing a field-patrol mission of a facility (e.g., facility 113 of FIG. 1). In an example, the field-patrol mission may include capturing images of and/or measuring readings for a set of target equipment (e.g., equipment 123-*a* and equipment 123-*b*, or all equipment 123, etc.) in the facility. In some cases, a mission 115 may include identifying all equipment 123 in need of repair or replacement (e.g., based on performance of the equipment 123) and implementing the repair or replacement.

Accordingly, for example, via the user interface 1100, the user may input a target task 1110 (or target goal 1105) and initiate a search (e.g., via search button 1112) of a data record of mission files. The robot system platform may identify and suggest, based on the target task 1110 and other factors described herein (e.g., contextual information, target criteria, confidence information, etc.), one or more missions 1115 that may perform the target task 1110.

The user interface 1100 may support user inputs for confirming (e.g., confirm 1116), rejecting (e.g., reject 1117), and/or modifying (e.g., modify 1117) a mission 1115 suggested by the robot system platform.

FIG. 12 illustrates example aspects of a mission history 1200 in accordance with aspects of the present disclosure. Aspects of the present disclosure support displaying the mission history 1200 in response to a user input selecting Mission History 1038 of FIG. 10.

The mission history 1200 may include feedback associated with a completed mission. The feedback may include a result of performing a task associated with a mission.

In an example, a mission may include tasks of capturing sensor information of a sensor 'PG003' and a sensor 'PG002'. The feedback may include robot information 1210, first information 1220 associated with reading information of sensor 'PG003', and second information 1230 associated with reading information of sensor 'PG002'. Alternatively, or additionally, this information may be retrieved from a memory (e.g., historian 612 in FIG. 6). The robot data may be used to determine whether the robot was a suitable robot for achieving this mission (e.g., whether the robot performed the mission, or tasks therein, with superior or inferior results, reliability, efficiency in time or energy, or the like, as compared with other robots). In some aspects, the robot data may be used as feedback to update planned or future missions (e.g., which robots are assigned to certain missions).

In some cases, the robot management system may support implementing AI and/or machine learning techniques for automatically determining respective values of sensor 'PG003' and a sensor 'PG002' based on an image analysis. Accordingly, for example, a robot or the robot management system may obtain readings information of the sensor 'PG003' and the sensor 'PG002' based on the image analysis.

In an example, after determining a result of a task (e.g., a sensor reading), the robot may transmit image data with information relating to the task. This information may be sent wirelessly from the location where the task was performed, or may be sent via a wired connection when the robot returns to home base. In an example, the robot may transmit the information to a robot system platform. The information may include both the result (e.g., a reading of the sensor) and any raw data or information gathered during the mission (e.g., the image data of the sensor). It will be understood that any information transmitted by the robot may be considered feedback, and may be saved in a database and may be used to define future missions.

In some aspects, the robot and/or robot management system may determine metrics data (e.g., performance data, temporal data, consumed power, use cost associated with the robot, etc.) associated with the completed tasks. Examples of such metrics data are described herein.

FIG. 13 illustrates a process flow 1300 that supports building a robot mission based on mission metrics according to aspects of the present disclosure. The process flow 1300 may be implemented, for example, in industrial setting facility 113 shown in FIG. 1. Aspects of the process flow 1300 may be implemented by a system 100 (e.g., of FIG. 1) an operation management system (e.g., operation management system 700 in FIG. 7), a user (e.g., via control system process control client 604, web client 606, or directly via an input device), an RSP (e.g., RSP 672), another system in communication with the RSP, or a robot fleet manager (e.g., robot fleet manager 628) of the RSP.

In the following description of the process flow 1300, the operations may be performed in a different order than the order shown, or the operations may be performed in different orders or at different times. Certain operations may also be left out of the process flow 1300, or other operations may be added to the process flow 1300.

At 1305, the process flow 1300 may include providing an inventory of recorded robot mission files. In an example, each mission corresponding to a respective robot mission file is assigned one or more performance metrics.

At 1310, the process flow 1300 may include receiving a user input. In some aspects, the user input identifies (e.g., includes an indication of) one or more tasks to be performed. The tasks may be robot-agnostic, process automation inspection tasks.

At 1315, the process flow 1300 may include determining current contextual information associated with a user and/or a facility (e.g., urgency associated with one or more tasks to be performed by the user and/or at the facility, etc.). In some cases, the process flow 1300 may include determining current constraints associated with the user and/or the facility (e.g., time constraints associated with the user and/or the facility).

At 1320, the process flow 1300 may include searching an inventory of recorded robot mission files for mission files that match one or more of the tasks (e.g., one or more of the robot-agnostic, process automation inspection tasks). For example, the process flow 1300 may include identifying recorded robot mission files having at least one task that matches the one or more tasks identified at 1310.

At 1325, the process flow 1300 may include ranking and/or sorting matching mission files based on any combination of: performance metrics associated with the matching mission files and the one or more tasks; the current contextual information associated with the user and/or facility; and the current constraints associated with the user and/or facility.

At 1330-*a*, the process flow 1300 may include, based on the ranking and/or sorting, recommending one or more recorded robot mission files. Additionally, or alternatively, at 1330-*b*, the process flow 1300 may include, presenting a set of recorded robot mission files based on a ranked order.

In some aspects, at 1335, the process flow 1300 may include performing (e.g., rerunning) a recommended mission (or missions). For example, 1335 may include performing the recommended mission (or missions) automatically in response to a confidence score associated with the recommended mission and a ranking thereof being above a confidence threshold. In another example, 1335 may include performing the recommended mission (or missions) semi-autonomously (e.g., in response to a user input confirming the recommended mission (or missions)).

FIG. 14 illustrates a process flow 1400 that supports building a robot mission based on mission metrics. The process flow 1400 may be implemented, for example, in industrial setting facility 113 shown in FIG. 1. Aspects of the process flow 1400 may be implemented by a system 100 (e.g., of FIG. 1), an operation management system (e.g., operation management system 700 in FIG. 7), a user (e.g., via control system process control client 604, web client 606, or directly via an input device), an RSP (e.g., RSP 672), another system in communication with the RSP, or a robot fleet manager (e.g., robot fleet manager 628) of the RSP.

In the following description of the process flow 1400, the operations may be performed in a different order than the order shown, or the operations may be performed in different orders or at different times. Certain operations may also be left out of the process flow 1400, or other operations may be added to the process flow 1400.

The process flow 1400 may be implemented by a robot management system including: an interface to provide commands to a plurality of robot devices of one or more robot types; and a data repository including a data record of mission files associated with a set of recorded robot missions. The robot management system is to manage one or more robot missions and the plurality of robot devices according to aspects of the process flow 1400.

At 1405, the process flow 1400 may include providing a data record of mission files associated with a set of recorded robot missions.

At 1410, the process flow 1400 may include receiving an input from a user including an indication of one or more robot-agnostic tasks to be performed with respect to an environment. In some aspects, the one or more robot-agnostic tasks include one or more process automation inspection tasks.

At 1415, the process flow 1400 may include determining first contextual information associated with the one or more robot-agnostic tasks. In some aspects, determining the first contextual information is based on a set of target criteria associated with the user, the environment, or both.

At 1420, the process flow 1400 may include searching the data record of the mission files and identifying, based on the search and the first contextual information, one or more mission files including one or more tasks that match the one or more robot-agnostic tasks.

In some aspects, the one or more identified mission files include metadata. In some aspects, the metadata includes at least one of: the recorded metrics data; second contextual information associated with the one or more identified mission files; and an indication of whether a recorded robot mission corresponding to the one or more identified mission files satisfied one or more target criteria.

In some aspects, the one or more identified mission files correspond to one or more recorded robot missions of the set of recorded robot missions.

In some aspects, the recorded metrics data includes at least one of: performance data associated with completing the one or more recorded robot missions; temporal data associated with completing the one or more recorded robot missions; and consumed power associated with completing the one or more recorded robot missions.

In some aspects, the recorded metrics data includes a use cost associated with a robot and completing the one or more recorded robot missions.

In some aspects, the recorded metrics data includes an indication of whether the one or more recorded robot missions included at least one operator intervention.

At 1425, the process flow 1400 may include generating ranking information associated with the one or more identified mission files based on recorded metrics data associated with the one or more identified mission files.

In some aspects, generating the ranking information associated with the one or more identified mission files is based on at least one of: the first contextual information associated with the one or more robot-agnostic tasks; and second contextual information associated with the one or more identified mission files.

In some aspects, the second contextual information includes at least one of: an operational status associated with a facility included in the environment; and environmental factors associated with the environment.

In some aspects, generating the ranking information associated with the one or more identified mission files is based on a set of target criteria associated with at least one of the user and the environment.

In some aspects, generating the ranking information associated with the one or more identified mission files is based on a quantity of the one or more tasks that match the one or more robot-agnostic tasks.

At 1430, the process flow 1400 may include providing the one or more identified mission files based on the ranking information. In some aspects, providing the one or more identified mission files includes displaying the one or more identified mission files based on the ranking information.

At 1435, the process flow 1400 may include determining a confidence value associated with the ranking information and the one or more identified mission files.

At 1440, the process flow 1400 may include automatically implementing at least a portion of the one or more recorded robot missions of the set of recorded robot missions based on the confidence value satisfying a threshold.

FIG. 15 illustrates a process flow 1500 that supports building a robot mission based on mission metrics. The process flow 1500 may be implemented, for example, in industrial setting facility 113 shown in FIG. 1. Aspects of the process flow 1500 may be implemented by a system 100 (e.g., of FIG. 1), an operation management system (e.g., operation management system 700 in FIG. 7), a user (e.g., via control system process control client 604, web client 606, or directly via an input device), an RSP (e.g., RSP 672), another system in communication with the RSP, or a robot fleet manager (e.g., robot fleet manager 628) of the RSP.

In the following description of the process flow 1500, the operations may be performed in a different order than the order shown, or the operations may be performed in different orders or at different times. Certain operations may also be left out of the process flow 1500, or other operations may be added to the process flow 1500.

Aspects of the process flow 1500 may be implemented by a robot management system including: an interface to provide commands to a plurality of robot devices of one or more robot types; and a data repository including a data record of mission files associated with a set of recorded robot missions. The robot management system is to manage one or more robot missions and the plurality of robot devices according to aspects of the process flow 1500.

At 1501, the process flow 1500 may include providing, to a machine learning model, image data acquired in association with one or more recorded robot missions of a set of recorded robot missions.

At 1503, the process flow 1500 may include receiving an output in response to the machine learning model processing the image data.

In some aspects, the output includes: one or more measured values in association with the one or more recorded robot missions; and one or more confidence values associated with the one or more measured values.

At 1505, the process flow 1500 may include providing a data record of mission files associated with the set of recorded robot missions.

At 1510, the process flow 1500 may include receiving an input from a user including an indication of one or more robot-agnostic tasks to be performed with respect to an environment.

At 1515, the process flow 1500 may include determining first contextual information associated with the one or more robot-agnostic tasks.

At 1520, the process flow 1500 may include searching the data record of the mission files and identifying, based on the search and the first contextual information, one or more mission files including one or more tasks that match the one or more robot-agnostic tasks.

At 1525, the process flow 1500 may include generating ranking information associated with the one or more identified mission files based on recorded metrics data associated with the one or more identified mission files. In some aspects, the recorded metrics data includes the one or more measured values, the one or more confidence values, or both (e.g., as output by the machine learning model at 1503).

At 1530, the process flow 1500 may include providing the one or more identified mission files based on the ranking information.

Any of the steps, functions, and operations discussed herein can be performed continuously and automatically.

FIG. 16 illustrates a process flow 1600 that supports building a robot mission based on mission metrics. The process flow 1600 may be implemented, for example, in industrial setting facility 113 shown in FIG. 1. Aspects of the process flow 1600 may be implemented by a system 100 (e.g., of FIG. 1), an operation management system (e.g., operation management system 700 in FIG. 7), a user (e.g., via control system process control client 604, web client 606, or directly via an input device), an RSP (e.g., RSP 672), another system in communication with the RSP, or a robot fleet manager (e.g., robot fleet manager 628) of the RSP.

In the following description of the process flow 1600, the operations may be performed in a different order than the order shown, or the operations may be performed in different orders or at different times. Certain operations may also be left out of the process flow 1600, or other operations may be added to the process flow 1600.

Aspects of the process flow 1600 may be implemented by a robot system platform including: an interface to provide commands to a plurality of robot devices, wherein the plurality of robot devices are independent of the robot system platform; a data repository including a data record of mission files associated with a set of recorded robot missions; and one or more circuits.

At 1605, the process flow 1600 may include electronically receiving an indication of one or more tasks to be performed with respect to an environment. In some aspects, the one or more tasks are absent an indication of at least one of: a target robot type associated with completing the one or more tasks; a target robot function in association with completing the one or more tasks; and a target quantity of robot devices in association with completing the one or more tasks.

At 1610, the process flow 1600 may include searching the data record of the mission files and providing, based on the search, one or more identified mission files corresponding to one or more recorded robot missions that at least partially completed the one or more tasks.

At 1615, the process flow 1600 may include generating ranking information associated with the one or more identified mission files based on recorded metrics data associated with the one or more identified mission files.

At 1620, the process flow 1600 may include providing the one or more identified mission files based on the ranking information.

The exemplary systems and methods of this disclosure have been described in relation to examples of a robot management system. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a communications network and/or the Internet, or within a dedicated secure, unsecured and/or encrypted system. Thus, it should be appreciated, that the components of the system can be combined into one or more devices, such as a server, communication device, or collocated on a particular node/element(s) of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various communications links, including communications channel(s), connecting the elements can be wired or wireless links, or any combination thereof, or any other known or later developed element(s) that is capable of supplying and/or communicating data and/or signals to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the process flows have been discussed and illustrated in relation to a particular sequence of events, it should be appreciated that changes, additions, and omissions to this sequence can occur without materially affecting the operation of the embodiment(s). Additionally, the exact sequence of events need not occur as set forth in the disclosed embodiments, but rather the steps can be performed by one or the other device(s) in the system. Additionally, the exemplary techniques illustrated herein are not limited to the specifically illustrated embodiments but can also be utilized with the other exemplary embodiments and each described feature is individually and separately claimable. As will be appreciated by one skilled in the art, aspects of the present disclosure may be embodied as a system, method, and/or computer program product. Thus, aspects of the present disclosure may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

A computer readable medium as described herein may be a computer readable storage medium, examples of which include, but are not limited to, an electronic, magnetic, optical, electromagnetic, infrared, or semiconductor system, apparatus, or device, or any suitable combination thereof. As used herein, a computer readable storage medium may be any non-transitory, tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof. A computer readable storage medium can be any computer readable medium that is not a computer readable signal medium such as a propagated data signal with computer readable program code embodied therein.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include C, C++, C #, Pascal, JAVA, JAVA Script, BASIC, Smalltalk, Visual Basic, and Visual C++.

Transmission of program code embodied on a computer readable medium can occur using any appropriate medium including, but not limited to, wireless, wired, optical fiber cable, radio frequency (RF), or any suitable combination thereof.

The program code may execute entirely on a user's/operator's/administrator's computer, partly on such a computer, as a stand-alone software package, partly on the user's/operator's/administrator's computer and partly on a remote computer, or entirely on a remote computer or server. Any such remote computer may be connected to the user's/operator's/administrator's computer through any type of network, including a local area network (LAN) or a wide area network (WAN), or the connection may be made to an external computer (for example, through the Internet using an Internet Service Provider).

A number of variations and modifications of the disclosure can be used. It would be possible to provide for some features of the disclosure without providing others.

In yet another embodiment, the systems, methods and protocols described herein can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various communication methods, protocols and techniques according to the aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein include, but are not limited to, at least one of Qualcomm® Snapdragon® 800 and 801, Qualcomm® Snapdragon® 610 and 615 with 4G LTE Integration and 64-bit computing, Apple® A7, A8, A8X, A9, A9X, or A10 processors with 64-bit architecture, Apple® M7, M8, M9, or M10 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer, workstation or mobile device platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized. The methods illustrated herein however can be readily implemented in hardware and/or software using any known or later developed systems or structures, devices and/or software by those of ordinary skill in the applicable art from the functional description provided herein and with a general basic knowledge of the computer and image processing arts.

In yet another embodiment, the disclosed methods may be partially implemented in software that can be stored on a storage medium, executed on programmed general-purpose computer with the cooperation of a controller and memory, a special purpose computer, mobile device, smartphone, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, as a plug-in, a system component, or the like. The system can also be implemented by physically incorporating the system and/or method into a software and/or hardware system, such as the hardware and software systems of an image processor.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

The terms "determine," "calculate," "compute," and variations thereof, as used herein, are used interchangeably and include any type of methodology, process, mathematical operation or technique.

While this technology has been described in conjunction with a number of embodiments, it is evident that many alternatives, modifications and variations would be or are apparent to those of ordinary skill in the applicable arts. Accordingly, it is intended to embrace all such alternatives, modifications, equivalents, and variations that are within the spirit and scope of this disclosure.

All references mentioned in the document submitted herewith are herein incorporated by reference in their entirety.

What is claimed is:

1. A method comprising:

providing a data record of mission files associated with a set of recorded robot missions;

receiving an input from a user comprising an indication of one or more robot-agnostic tasks to be performed with respect to an environment;

determining first contextual information associated with the one or more robot-agnostic tasks, wherein the first contextual information comprises a status of a facility within the environment;

searching the data record of the mission files and identifying, based on at least the first contextual information, one or more mission files comprising one or more tasks that match the one or more robot-agnostic tasks;

generating ranking information associated with the one or more identified mission files based on recorded metrics data associated with the one or more identified mission files, wherein the recorded metrics data comprises images captured during previous missions, wherein the ranking information is generated based on data quality of the recorded metrics data, and wherein the data quality of the recorded metrics data is indicative of image quality comprising resolution and clarity of the images;

determining a confidence value associated with the ranking information and the one or more identified mission files; and automatically implementing one or more recorded robot missions of the set of recorded robot missions based on the confidence value satisfying a threshold.

2. The method of claim 1, wherein generating the ranking information associated with the one or more identified mission files is based on at least one of:

the first contextual information associated with the one or more robot-agnostic tasks; and second contextual information associated with the one or more identified mission files.

3. The method of claim 2, wherein the second contextual information includes environmental factors associated with the environment.

4. The method of claim 1, wherein:

the one or more identified mission files comprise metadata; and the metadata comprises at least one of:

the recorded metrics data;

second contextual information associated with the one or more identified mission files; and an indication of whether a recorded robot mission corresponding to the one or more identified mission files satisfied one or more target criteria.

5. The method of claim 1, wherein generating the ranking information associated with the one or more identified mission files is based on:

a set of target criteria associated with at least one of the user and the environment.

6. The method of claim 1, wherein generating the ranking information associated with the one or more identified mission files is based on:

a quantity of the one or more tasks that match the one or more robot-agnostic tasks.

7. The method of claim 1, wherein determining the first contextual information is based on a set of target criteria associated with the user, the environment, or both.

8. The method of claim 1, wherein the one or more robot-agnostic tasks comprise one or more process automation inspection tasks.

9. The method of claim 1, further comprising displaying the one or more identified mission files based on the ranking information.

10. The method of claim 1, wherein the recorded metrics data comprises at least one of:

performance data associated with completing the one or more recorded robot missions;

temporal data associated with completing the one or more recorded robot missions; and consumed power associated with completing the one or more recorded robot missions.

11. The method of claim 1, wherein the recorded metrics data comprises a use cost associated with a robot and completing the one or more recorded robot missions.

12. The method of claim 1, wherein the recorded metrics data comprises an indication of whether the one or more recorded robot missions comprised at least one operator intervention.

13. The method of claim 1, further comprising:

providing, to a machine learning model, image data acquired in association with the one or more recorded robot missions of the set of recorded robot missions; and receiving an output in response to the machine learning model processing the image data, wherein the output comprises:

one or more measured values in association with the one or more recorded robot missions; and one or more confidence values associated with the one or more measured values, wherein the recorded metrics data comprises the one or more measured values, the one or more confidence values, or both.

14. A robot management system comprising:

an interface to provide commands to a plurality of robot devices of one or more robot types; and a data repository comprising a data record of mission files associated with a set of recorded robot missions, wherein the robot management system is to manage one or more robot missions and the plurality of robot devices by:

receiving an indication of one or more robot-agnostic tasks to be performed with respect to an environment;

determining first contextual information associated with the one or more robot-agnostic tasks, wherein the first contextual information comprises, for at least one recorded robot mission in the set of recorded robot missions, an indication of whether a facility within the environment was operating normally, undergoing maintenance, undergoing calibration, or undergoing testing when the at least one recorded robot mission was implemented;

searching the data record of the mission files and identifying, based on at least the first contextual information, one or more mission files comprising one or more tasks that match the one or more robot-agnostic tasks;

generating ranking information associated with the one or more identified mission files based on recorded metrics data associated with the one or more identified mission files, wherein the recorded metrics data comprises images captured during previous missions, wherein the ranking information is generated based on data quality of the recorded metrics data, and wherein the data quality of the recorded metrics data is indicative of image quality comprising resolution and clarity of the images; and automatically implementing a first recorded robot mission of the set of recorded robot missions based on the ranking information.

15. The system of claim 14, wherein generating the ranking information associated with the one or more identified mission files is based on at least one of:

the first contextual information associated with the one or more robot-agnostic tasks; and second contextual information associated with the one or more identified mission files.

16. The system of claim 15, wherein the second contextual information includes environmental factors associated with the environment.

17. The system of claim 14, wherein:

the one or more identified mission files comprise metadata; and the metadata comprises at least one of:

the recorded metrics data;

second contextual information associated with the one or more identified mission files; and an indication of whether a recorded robot mission corresponding to the one or more identified mission files satisfied one or more target criteria.

18. A robot system platform comprising:

an interface to provide commands to a plurality of robot devices, wherein the plurality of robot devices are independent of the robot system platform;

a data repository comprising a data record of mission files associated with a set of recorded robot missions; and one or more circuits to:

electronically receive an indication of one or more tasks to be performed with respect to an environment, wherein the one or more tasks are absent an indication of at least one of:

a target robot type associated with completing the one or more tasks;

a target robot function in association with completing the one or more tasks; and a target quantity of robot devices in association with completing the one or more tasks;

search the data record of the mission files and identify one or more mission files corresponding to one or more recorded robot missions that at least partially completed the one or more tasks, wherein identifying the one or more mission files is based at least
partially on a status of a facility within the environment;

generate ranking information associated with the one or
more identified mission files based on recorded metrics data associated with the one or more identified
mission files, wherein the recorded metrics data
comprises images captured during previous missions, wherein the ranking information is generated
based on data quality of the recorded metrics data,
and wherein the data quality of the recorded metrics
data is indicative of image quality comprising resolution and clarity of the images; and implement a mission file of the one or more identified
mission files based on the ranking information.

19. The method of claim 1, further comprising:
recording the metrics data as metadata of recorded mission files.

\*  \*  \*  \*  \*